US011877213B2

(12) United States Patent
Gordon et al.

(10) Patent No.: US 11,877,213 B2
(45) Date of Patent: *Jan. 16, 2024

(54) METHODS AND SYSTEMS FOR ASSET OBFUSCATION

(71) Applicant: Visa International Service Association, San Francisco, CA (US)

(72) Inventors: James Gordon, Lafayette, CA (US); Roopesh Joshi, San Ramon, CA (US); David Horton, Dublin, CA (US); Johan Van Tilburg, Bluffton, SC (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,135

(22) Filed: Dec. 17, 2021

(65) Prior Publication Data

US 2022/0116745 A1  Apr. 14, 2022

Related U.S. Application Data

(63) Continuation of application No. 14/869,781, filed on Sep. 29, 2015, now Pat. No. 11,234,105.

(Continued)

(51) Int. Cl.
*G06Q 20/36* (2012.01)
*G06Q 20/32* (2012.01)
(Continued)

(52) U.S. Cl.
CPC .............. *H04W 4/06* (2013.01); *G06Q 20/20* (2013.01); *G06Q 20/3221* (2013.01);
(Continued)

(58) Field of Classification Search
CPC .................... G06Q 20/00–425; H04L 9/00–50
See application file for complete search history.

(56) References Cited

U.S. PATENT DOCUMENTS 8,176,337 B2 * 5/2012 Ciet ..................... G06F 21/577
713/192
8,255,687 B1 8/2012 Pelly et al.
(Continued)

FOREIGN PATENT DOCUMENTS

WO  2010023683  3/2010

OTHER PUBLICATIONS

Christian Collberg, et al., "A Taxonomy of Obfuscating Transformations", Technical Report #148, Department of Computer Science, The University of Auckland, Privage Bag 92019, Auckland, New Zealand, 36 pages.
(Continued)

*Primary Examiner* — Ari Shahabi
(74) *Attorney, Agent, or Firm* — Kilpatrick Townsend & Stockton LLP

(57) ABSTRACT

Techniques for obfuscating and deploying digital assets (e.g., mobile applications) are provided to mitigate the risk of unauthorized disclosure. An asset can be received that is to be deployed to a plurality of mobile devices, each of the mobile devices associated with a corresponding account having account attributes. A deployment group of one or more mobile devices for deploying the asset can be identified based on a set of one or more obfuscation parameters, comprising account attributes shared among the one or more mobile devices within the deployment group. A customized obfuscation scheme to be applied to the asset can be determined based at least in part on the set of obfuscation parameters. The customized obfuscation scheme can be applied to the asset to generate an obfuscated asset. The obfuscated asset can be transmitted and/or updated over a network to the one or more mobile devices within the deployment group.

19 Claims, 11 Drawing Sheets

Related U.S. Application Data

(60) Provisional application No. 62/057,042, filed on Sep. 29, 2014.

(51) Int. Cl.
  *G06Q 20/20* (2012.01)
  *H04W 4/06* (2009.01)
  *H04L 9/40* (2022.01)
  *H04W 12/02* (2009.01)
  *H04W 12/04* (2021.01)
  *H04W 12/12* (2021.01)

(52) U.S. Cl.
  CPC ......... *G06Q 20/36* (2013.01); *H04L 63/0414* (2013.01); *H04W 12/02* (2013.01); *H04L 63/061* (2013.01); *H04W 12/04* (2013.01); *H04W 12/12* (2013.01)

(56) References Cited

U.S. PATENT DOCUMENTS

| | | | | |
|---|---|---|---|---|
| 8,725,745 | B2* | 5/2014 | Zargahi | G06F 8/61 |
| | | | | 707/754 |
| 8,756,318 | B1* | 6/2014 | Reus | G06F 15/16 |
| | | | | 709/225 |
| 2004/0172550 | A1* | 9/2004 | Sai | H04L 63/20 |
| | | | | 713/193 |
| 2005/0069138 | A1 | 3/2005 | DeJong | |
| 2006/0259433 | A1 | 11/2006 | Lahtinen et al. | |
| 2009/0210698 | A1* | 8/2009 | Candelore | G06Q 20/3829 |
| | | | | 713/153 |
| 2009/0249076 | A1* | 10/2009 | Reed | H04L 9/3228 |
| | | | | 713/168 |
| 2010/0291904 | A1 | 11/2010 | Musfeldt et al. | |
| 2012/0172026 | A1 | 7/2012 | Kwon et al. | |
| 2013/0035070 | A1 | 2/2013 | Fisher | |
| 2013/0125090 | A1 | 5/2013 | Durand et al. | |
| 2013/0283397 | A1 | 10/2013 | Griffin | |
| 2015/0120472 | A1 | 4/2015 | Aabye et al. | |
| 2016/0092871 | A1 | 3/2016 | Gordon et al. | |

OTHER PUBLICATIONS

Yoni De Mulder, "White-Box Cryptography, Analysis of White-Box AES Implementations", Dissertation presented in partial fulfillment of the requirements for the degree of Doctor in Engineering, Feb. 2014, Ku Leuven, Arenberg Doctoral School, Faculty of Engineering Science.

U.S. Appl. No. 14/869,781, Advisory Action, dated Nov. 25, 2020, 4 pages.

U.S. Appl. No. 14/869,781, Final Office Action, dated Aug. 27, 2019, 12 pages.

U.S. Appl. No. 14/869,781, Final Office Action, dated Sep. 16, 2020, 19 pages.

U.S. Appl. No. 14/869,781, Final Office Action, dated Jun. 28, 2021, 5 pages.

U.S. Appl. No. 14/869,781, Non-Final Office Action, dated Mar. 29, 2019, 13 pages.

U.S. Appl. No. 14/869,781, Non-Final Office Action, dated Jan. 4, 2021, 20 pages.

U.S. Appl. No. 14/869,781, Non-Final Office Action, dated Apr. 1, 2020, 21 pages.

U.S. Appl. No. 14/869,781, Notice of Allowance, dated Sep. 14, 2021, 9 pages.

* cited by examiner

METHODS AND SYSTEMS FOR ASSET OBFUSCATION

CROSS-REFERENCES TO RELATED APPLICATIONS

The present application is a continuation application of U.S. application Ser. No. 14/869,781, filed Sep. 29, 2015, which is a non-provisional of and claims priority to U.S. Provisional Application 62/057,042, filed on Sep. 29, 2014. The entire contents of the above applications are hereby incorporated by reference for all purposes in their entirety.

BACKGROUND

Host Card Emulation (HCE) technology provides mobile payments that can be conducted via mobile devices without the requirement of utilizing secure elements (SE). However, without requiring the use of secure elements to securely store payment credentials, HCE may be susceptible to similar threats as in card-present as well as in card-not-present (CNP) e-commerce transactions, even though it may involve the added complexity of needing to penetrate many consumer devices.

Embodiments of the present invention address these and other problems, individually and collectively.

BRIEF SUMMARY

Embodiments of the present invention provide methods, devices, and systems for obfuscating digital assets (e.g., mobile applications) so as mitigate the risk of massive or scalable attacks. According to embodiments, methods, devices, and systems for obfuscating assets related to a mobile application are provided.

According to embodiments, a method can be provided. The method can comprise receiving a mobile application that is to be installed on a plurality of mobile devices, each of the mobile devices associated with a corresponding account, each account having account attributes, identifying a deployment group of one or more mobile devices for deploying the mobile application based on a first set of one or more obfuscation parameters, the first set of obfuscation parameters comprising one or more account attributes shared among the one or more mobile devices within the deployment group, determining a first customized obfuscation scheme to be applied to the mobile application based at least in part on the first set of obfuscation parameters, applying the first customized obfuscation scheme to the mobile application to generate a first obfuscated mobile application, and transmitting over a network the first obfuscated mobile application to the one or more mobile devices within the deployment group.

In some embodiments, determining the first customized obfuscation scheme comprises selecting the customized obfuscation scheme from a plurality of obfuscation schemes based at least in part on the first set of obfuscation parameters. In some embodiments, determining the first customized obfuscation scheme comprises providing the first set of obfuscation parameters as an input to an obfuscation algorithm to determine the first customized obfuscation scheme. In some embodiments, the first customized obfuscation scheme can be determined based on a hash of at least one of the first set of obfuscation parameters.

In some embodiments, determining the first customized obfuscation scheme comprises obtaining an indicator of desired obfuscation strength to be applied in the first customized obfuscation scheme for the mobile application; and determining one or more categories of information to obfuscate based on the indicator of obfuscation strength associated with the first obfuscated mobile application, the one or more categories of information comprising code, data, or cryptographic key. In some embodiments, determining the first customized obfuscation scheme comprises determining a level of obfuscation to be used for obfuscating information of at least one category of the one or more categories of information based on the indicator of obfuscation strength associated with the obfuscated asset.

In some embodiments, the one or more account attributes comprise at least one of: an account identifier, a range of account identifiers, an issuer, an account holder, or a credit limit. In some embodiments, the first set of obfuscation parameters further comprise a time parameter indicating an estimated time to de-obfuscate the obfuscated asset. De-obfuscating the first obfuscated asset can comprise reverse engineering or decrypting the first obfuscated asset. In some embodiments, the first set of obfuscation parameters further comprise a time for updating obfuscation of the mobile application, the time corresponding to a level of obfuscation strength associated with the first obfuscated mobile application. In some embodiments, the first set of obfuscation parameters further comprise a device characteristic associated with the one or more mobile devices.

In some embodiments, the asset comprises code, data, or a cryptographic key. In some embodiments, the asset comprises a mobile application.

In some embodiments, methods discussed herein can further comprise determining that the obfuscation of the mobile application is to be updated, determining a second customized obfuscation scheme to be applied to the mobile application based at least in part on a second set of one or more obfuscation parameters, applying the second customized obfuscation scheme to the mobile application to generate a second obfuscated mobile application, and deploying the second obfuscated mobile application to at least one of the one or more mobile devices within the deployment group.

In some embodiments, methods discussed herein can further comprise determining that the obfuscation of the mobile application is to be updated, transmitting, to at least one mobile device of the one or more mobile devices within the deployment group, one or more instructions for applying an updated obfuscation scheme to the mobile application using a second set of one or more obfuscation parameters, wherein the at least one mobile device is configured to implement the update obfuscation for the mobile application based on the one or more instructions. In some embodiments, the one or more instructions include the second set of one or more obfuscation parameters.

An update frequency for updating the mobile application can be determined based at least in part on a level of strength of the first customized obfuscation scheme and/or the first set of obfuscation parameters. The update can be applied to a whole mobile application or a portion thereof. The update can be performed by an asset provider, a mobile device, or a combination thereof.

According to embodiments, one or more non-transitory computer-readable storage media are provided, storing computer-executable instructions that, when executed by a computing system, configure the computing system to perform operations comprising: receiving an asset that is to be deployed to a plurality of mobile devices, each of the mobile devices associated with a corresponding account, each account having account attributes, identifying a deployment group of one or more mobile devices for deploying the asset based on a first set of one or more obfuscation parameters, the first set of obfuscation parameters comprising one or more account attributes shared among the one or more mobile devices within the deployment group, determining a first customized obfuscation scheme to be applied to the asset based at least in part on the first set of obfuscation parameters, applying the first customized obfuscation scheme to the asset to generate a first obfuscated asset, and transmitting over a network the first obfuscated asset to the one or more mobile devices within the deployment group.

In some embodiments, determining the first customized obfuscation scheme comprises selecting the customized obfuscation scheme from a plurality of obfuscation schemes based at least in part on the first set of obfuscation parameters. In some embodiments, determining the first customized obfuscation scheme comprises providing the first set of obfuscation parameters as an input to an obfuscation algorithm to determine the first customized obfuscation scheme. The first set of obfuscation parameters can further comprise a time parameter indicating a level of obfuscation strength associated with the obfuscated asset. The asset can comprise code, data, or a cryptographic key.

In some embodiments, applying the first obfuscation scheme to the asset comprises determining a portion of the asset to apply the first obfuscation scheme. In some embodiments, the first obfuscation scheme is applied to a first portion of the asset, a second customized obfuscation scheme to be applied to the asset is determined based at least in part on the first set of obfuscation parameters, and the second customized obfuscation scheme is applied to a second portion of the asset.

In some embodiments, the instructions, when executed with the computer system, further cause the computer system to perform operations comprising determine a time when the asset needs to be updated based at least in part on a level of strength of the first customized obfuscation scheme, determining a second customized obfuscation scheme to be applied to at least one portion of the asset based at least in part on a second set of one or more obfuscation parameters, and applying the second customized obfuscation scheme to the at least one portion of the asset to generate a second obfuscated asset. In some embodiments, determining the time when the asset needs to be updated is based at least in part on an indicator of level of obfuscation strength of the first customized obfuscation scheme.

According to embodiments, a computer system is provided. The computer system comprises a memory that stores computer-executable instructions; and a processor configured to access the memory and execute the computer-executable instructions to at least: receive an asset that is to be deployed to a plurality of mobile devices, each of the mobile devices associated with a corresponding account, each account having account attributes; identify a deployment group of one or more mobile devices for deploying the asset based on a set of one or more obfuscation parameters, the set of obfuscation parameters comprising one or more account attributes shared among the one or more mobile devices within the deployment group; determine a customized obfuscation scheme to be applied to the asset based at least in part on the set of obfuscation parameters; apply the customized obfuscation scheme to the asset to generate an obfuscated asset; and transmit over a network the obfuscated asset to the one or more mobile devices within the deployment group.

TERMS

Figure 1:
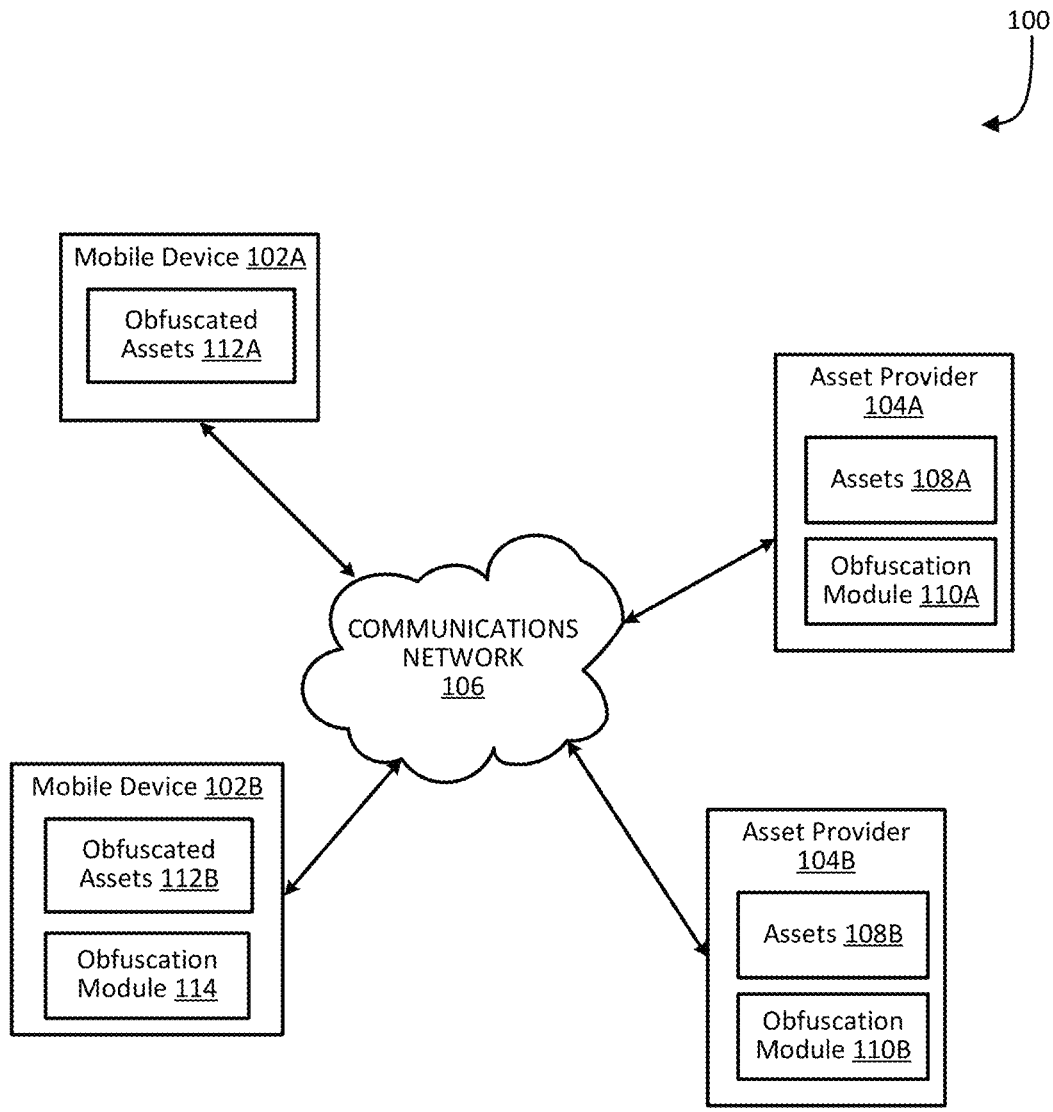
FIG. 1 illustrates an example asset obfuscation system, in accordance with some embodiments.

Prior to discussing embodiments of the invention, description of some terms may be helpful in understanding embodiments of the invention.

A "communication device" may be a device that includes one or more electronic components (e.g., an integrated chip) that can communicate with another device. A "portable communication device" or "mobile device" is a communication device that can be transported and operated by a user. A mobile device may provide remote communication capabilities to a network. The mobile device can be configured to transmit and receive data or communications to and from other devices. A mobile device may be in the form of a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of mobile devices may also include portable computing devices (e.g., laptops, netbooks, ultrabooks, etc.). A mobile device may also be in the form of a vehicle (e.g., an automobile such as car) equipped with communication capabilities.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a mobile device such as an account enrolled in a mobile application installed on a mobile device. An issuer may also issue account parameters associated with the account to a mobile device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a communication device such as a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. In some scenarios, the merchant associated the access device may be a transit agency or a transit operator, and the access device may be a transit gate or transit terminal. An access device may use any suitable contact or contactless mode of operation to send or receive data from, or associated with, a mobile device. In some embodiments, where an access device may include a reader, a processor, and a computer-readable medium. A reader may include any suitable contact or contactless mode of operation. For a contactless mode of operation, a reader may include a contactless interface transceiver (e.g., a NFC transceiver) to interact with a mobile device. Other example components of exemplary readers may include radio frequency (RF) antennas, optical scanners, bar code readers, or magnetic stripe readers to interact with a mobile device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle, or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data, or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "certificate" may refer to an attestation of the authenticity of some information. For example, a key certificate can be an electronic document used to prove the authenticity and/or ownership of a key. A certificate can be issued by a certificate authority, which is a trusted entity that verifies the certificate's contents.

A "signature" may refer to electronic information that can be used to demonstrate the authenticity of an item (e.g., a message, document, application, etc.). For example, a signature can be a digital signature that employs asymmetric cryptography (e.g., public key infrastructure PKI) in which a piece of information is encrypted using a private key, and successful decryption of the information using a public key can be used to verify the authenticity of the source of that information.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include advanced encryption standard (AES), data encryption standard (DES), triple data encryption standard (TDES), RSA, Elliptic Curve Cryptography (ECC), and the like.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

Details of some embodiments of the present invention will now be described.

DETAILED DESCRIPTION

Embodiments of the present invention provide methods, devices, and systems for obfuscating digital assets (e.g., mobile applications) so as mitigate the risk of massive or scalable attacks. Specifically, a deployment group of mobile devices for deploying an asset can be identified based on obfuscation parameters shared among the mobile devices within the deployment group, such account attributes, device attributes, and the like. In some cases, the obfuscation parameters can also include a time parameter indicating a level of strength of the obfuscation to be applied to the asset.

The asset can be obfuscated using an obfuscation scheme that is customized for this deployment group. For instance, the customized obfuscation scheme can be selected from a plurality of obfuscation schemes based on the shared obfuscation parameters for the mobile devices. As another example, the customized obfuscation scheme can be determined by providing the shared obfuscation parameters as an input to an obfuscation algorithm. The customized obfuscation scheme can be applied to the asset and the obfuscated asset can be deployed to the mobile devices within the deployment group.

In some embodiments, updated obfuscation can be applied to a previously-deployed asset to provide additional security. The aspects of the update (e.g., update frequency, update obfuscation techniques) can be determined based on the obfuscation parameters. Specifically, aspects of the update can be determined based on a level of strength of the previous-deployed obfuscation. Additionally or alternatively, aspects of the update can be determined based on an updated set of obfuscation parameters.

Embodiments of the customized obfuscation techniques described herein can force attackers to build into their malware different solutions for each new upgrade or variation in security implementation, therefore increasing the size of the necessary malware, making it easier to identify and prevent. Such malware would also take more time and effort to develop, limiting the window for deployment. In addition, the size of the user communities affected by a successful attack can be decreased.

I. Assets

The obfuscation methods described herein can be used to obfuscate digital assets that may be provisioned or provided to devices. Digital assets or assets can refer to any digital information that can be obfuscated and transmitted from one device to another device. Assets can include code, data, cryptographic keys, or a combination thereof. For instance, an asset can include a mobile application or a portion thereof. Code can include one or more executable instructions or programs that may be executed by a computer to perform certain tasks. Examples of codes can include programs for implementing a cryptographic algorithm (e.g., a cipher) for encryption and/or decryption, for initiating and/or processing payment transactions, for managing account information, or any other functionality. A cryptographic algorithm can be an encryption algorithm that transforms original data into an alternate representation, or a decryption algorithm that transforms encrypted information back to the original data. Examples of cryptographic algorithms may include AES, DES, TDES, RSA, ECC, etc.). In some embodiments, code may include or be included in a software development kit (SDK) that is used to create applications and/or integrated in an application.

Assets can also include data. Examples of data can include input or output data for code or applications, configuration data for mobile applications, mobile devices, or accounts, account or credential parameters (e.g., PAN and expiration date), transaction data (e.g., transaction timestamp, transaction amount, transaction type indicator, transaction device identifier), and user data (e.g., user preferences or user profile data), risk management data (e.g., Application Transaction Counter (ATC), device threshold parameters, etc.), authentication data (e.g., Consumer Device Cardholder Verification Method (CDCVM)), and the like. In some embodiments, data can include derivation parameters or instructions used to derive keys such as a cryptographic nonce (e.g., a random number).

Assets can also include cryptographic keys. A key may refer to a piece of information that is used in a cryptographic algorithm to transform input data into another representation. In some embodiments, keys can include limited use keys (LUKs) that can be used only in a limited fashion (e.g., for a limited duration, for a limited number of times, in a limited context, etc.). Keys can include symmetric or asymmetric (e.g., private/public) keys. Keys may be static or dynamically generated and/or replenished. In some cases, keys may be used, in conjunction with a cryptographic algorithm, to protect data in storage and/or in transit. In some cases, keys (e.g., an LUK) may be used to derive other keys or cryptograms that may be used to conduct transactions.

II. Obfuscation Parameters

Assets described herein may be obfuscated based on obfuscation parameters. Obfuscation parameters can include any information that can be used to facilitate the obfuscation of assets. In some embodiments, obfuscation parameters can include account attributes, time parameters, device parameters, or any other suitable parameters. Account attributes can include attributes related to an account such as a payment account. Examples of account attributes can include an account identifier (e.g., a PAN or a token) or a range of account identifiers, an issuer of the account, an account holder identifier, a credit limit, an expiration date, a geographic region, a risk score, or a range of risk scores, and the like. In some embodiments, a mobile device may be associated with one or more accounts, each with corresponding account attributes.

Time parameters can be expressed in any suitable format of time such as seconds, minutes, hours, days, weeks, months, years, and the like. The time parameters can include a time-to-break parameter that indicates a desired level of strength or resistance to de-obfuscation (e.g., reverse engineering) for an obfuscated asset. Alternatively or additionally, the time parameter can include a time-to-update parameter that indicates a time period until the time of the next update obfuscation. Such time parameters can be used to dictate, at least in part, the obfuscation techniques used to obfuscate the asset and/or the manner the obfuscation techniques are applied. For instance, a stronger set of obfuscation techniques may be used based on a longer time-to-break parameter than a shorter time-to-break parameter. Likewise, weaker forms of obfuscation may be used based on a shorter time-to-update parameter than a longer time-to-update parameter.

Other obfuscation parameters can include device attributes about mobile devices (e.g., geographic regions or locations of mobile devices, device identification information, software/hardware characteristics (e.g., operating system, CPU, memory, etc.), user information (e.g., user identifier, user preferences or profiles), business rules or requirements, guidelines and regulations, and the like.

The obfuscation parameters may be static or dynamically changing. For instance, some of the account attributes such as account identifier (e.g., PAN or token) and issuer may be static or semi-static (i.e., does not change for a relatively long period of time). Other account attributes such as a risk score may be dynamically generated (e.g., based on account history). In some examples, a time parameter such as a time-to-break or time-to-update parameter may be dynamically determined based on the latest security landscape, business requirement, and the like. In some other examples, a time parameter may be static. In some examples, some or all of the device attributes (e.g., device identifier) may be static whereas other device attributes (e.g., software/hardware characteristics or geographic location of the device) may be dynamically changing.

In some embodiments, one or more obfuscation parameters can be aggregated and/or combined to form an input to an obfuscation scheme or technique used to obfuscate an asset. For instance, an identifier may be generated based on a given combination of obfuscation parameters. The identifier may be provided as an input to the obfuscation scheme. In an example, the identifier may include a hash of the combination of obfuscation parameters and the hash may be used to generate a key for a cryptographic algorithm used to encrypt the asset. In such embodiments, given an asset, the same obfuscation scheme (e.g., the same cryptographic algorithm) may be used to generate different obfuscated assets for different combinations of obfuscation parameters because of the different inputs (e.g., keys) to the obfuscation process.

In other embodiments, one or more obfuscation parameters can be used to select a subset of one or more customized obfuscation schemes or techniques from a set of more than one obfuscation schemes or techniques. For instance, the selection of the obfuscation schemes may be based on account attributes. As an example, assets for accounts within a particular PAN or token range and/or associated with a particular issuer may be obfuscated using a selected subset of obfuscation schemes; whereas assets for accounts within a different PAN or token range and/or associated with a different issuer may be obfuscated using a different subset of obfuscation schemes. Additionally or alternatively, the selection of the obfuscation techniques may be based on a time parameter, device attributes, and/or other obfuscation parameters.

In some embodiments, any of the obfuscation parameters discussed herein can be generated, retrieved, or otherwise obtained at any suitable time. In some examples, the obfuscation parameters may be obtained on a periodic basis (e.g., every day). In other examples, the obfuscation parameters may be obtained based on predefined triggering events (e.g., changing of values, user actions, push/pull triggers). In some embodiments, any of the obfuscation parameters discussed herein can be used during an initial obfuscation of an asset and/or during subsequent updates to obfuscation of the asset. For instance, a first combination of the obfuscation parameters may be used during the initial obfuscation of an asset. A second combination of the obfuscation parameters may be used during a subsequent update obfuscation of the same asset. The first combination and the second combination of obfuscation parameters may or may not overlap.

III. Obfuscation Schemes

Obfuscation is used generally to refer to any process for transforming, rearranging, or masking, or otherwise protecting information so as to make it difficult to understand, determine, tamper with, or reverse engineer the underlying information. Correspondingly, de-obfuscation refers generally to the reverse process of unscrambling, decrypting, tampering with, or reverse engineering obfuscated information so as to uncover the underlying information.

Depending on the type of asset that is being obfuscated, different obfuscation schemes or techniques can be used. An asset can be obfuscated using one or more types of obfuscation techniques. Different portions of an asset may be obfuscated using the same or different obfuscation techniques. For example, obfuscation schemes for data can include encryption, encoding, masking, scrambling, truncating, and the like. Encryption schemes can include symmetric-key algorithms (e.g., stream ciphers and block ciphers) and asymmetric-key or public-key algorithms (e.g., RSA, ECC). Obfuscation schemes for code can include any techniques that render source code, machine code, or intermediate code or data difficult to understand, determine, or reverse engineer including encryption, white-box cryptography, and various code obfuscation techniques such as name obfuscation (e.g., replacing identifiers with meaningless strings), code flow obfuscation (e.g., changing the control flow), embedding information (e.g., inserting random information), and the like. Obfuscation schemes for keys can include any technique to prevent key extraction such as encryption, white-box cryptography, and the like.

Different obfuscation techniques may have different strength or resistance against de-obfuscation efforts (e.g., disclosure, decryption, tampering, cryptanalysis, or reverse engineering). The more resistant an obfuscation technique is to a de-obfuscation attack, the stronger the obfuscation technique is; and vice versa. In some cases, the strength of different obfuscation techniques may be determined based on the cryptographic complexity, key size, and other factors. In some cases, the strengths of obfuscation techniques may be determined with respect to a specific type or types of attacks. In some embodiments, a level of strength may be selected from a plurality of levels of strength and used to determine a set of one or more obfuscation schemes that would provide the given level of strength. In some other embodiments, a level of strength associated with a set of one or more obfuscation schemes may be determined by analyzing the obfuscation schemes.

In some embodiments, an asset may be obfuscated at an arbitrary number of levels using any suitable obfuscation techniques. Different types of assets may be obfuscated at different levels. The obfuscated asset may be used by the mobile device as is or de-obfuscated at least partially. For example, a piece of data (e.g., payment credentials) may be encrypted using a first encryption key. The encrypted data under the first key may be encrypted again using a second encryption key. The resulting encrypted data may be encrypted again using a third encryption key. Partial de-obfuscation of the triple-encrypted data can include decryption of the triple-encrypted data using the third encryption key to obtain the double-encrypted data, or decryption of the double-encrypted data using the second encryption key to obtain the single-encrypted data. On the other hand, complete de-obfuscation of the triple-encrypted data can include decryption of the triple-encrypted data using the third, second, and first encryption keys to obtain the original unencrypted data. In another example (e.g., using TDES), data may be encrypted, decrypted, and encrypted again.

As another example, a code asset implementing a cryptographic algorithm (e.g., AES, DES, TDES, RSA, ECC, etc.) may be obfuscated once using white-box cryptography to hide a secret key used by the cryptographic algorithm. Additionally, the white-boxed cryptographic algorithm may be obfuscated again using one or more code obfuscation techniques such as code encryption, variable renaming, flow transformation, dummy code insertion, register renaming, and the like. The code obfuscation may occur at the source code level, compiled code level, or both. Correspondingly, a mobile device that receives the obfuscated asset may use the fully obfuscated code as is or partially de-obfuscate the obfuscated asset (e.g., by decrypting the executable code) while retaining certain levels of obfuscation (e.g., white-box cryptography).

Similarly, a cryptographic key may be obfuscated at multiple levels. As an example, an encryption key used by a cryptographic algorithm can be considered obfuscated when the cryptographic algorithm is transformed using white-box cryptography and the key can be considered further obfuscated when the white-boxed cryptographic algorithm is further obfuscated using code obfuscation techniques. As another example, a limited use key (LUK) used for generating cryptograms (e.g., transaction cryptograms) for conducting transactions may be obfuscated by encryption using a first encryption key and again using a second encryption key.

In some embodiments, different portions of an asset may be obfuscated at different levels. In some embodiments, a first portion of an asset may be obfuscated at a first number of levels while a second portion of the asset may be un-obfuscated or obfuscated at a second number of levels. For instance, a sensitive portion of a document may be doubly-encrypted while a less sensitive portion of the document may be encrypted only once. As another example, an on-device cloud based transaction logic portion of a mobile application may be obfuscated using while-box cryptography as well as code obfuscation while another portion of the mobile application may be obfuscated only once using encryption. As another example, a first portion of a cryptographic key may be obfuscated at three levels (e.g., encrypted three times) while a second portion of the cryptographic key may be obfuscated at only two levels (e.g., encrypted twice).

In some embodiments, different obfuscation techniques may be applied to a set of assets. For instance, a first set of one or more obfuscation techniques may be applied to a first subset of a set of assets (e.g., code, data, and/or keys), where as a second set of one or more obfuscation techniques may be applied to a second subset of the set of assets that may or may not overlap with the first subset. If the first subset and the second subset overlap, then the overlapping set of assets is obfuscated using both the first and second sets of obfuscation techniques. Similarly, different obfuscation techniques may be applied to overlapping or non-overlapping portions of an asset. For instance, a first set of one or more obfuscation technique may be applied to a first subset of a data set, where as a second set of one or more obfuscation technique may be applied to a second subset of the data set that may or may not overlap with the first subset. If the first subset and the second subset overlap, then the overlapping portion is obfuscated using both the first and the second sets of obfuscation techniques.

It is understood that any suitable obfuscation schemes can be used for obfuscating assets using methods described herein. Exemplary obfuscation schemes include those described in "A Taxonomy of Obfuscating Transformations" by Christian Collberg, Clark Tomborson and Douglas Low (Technical Report #148) and "White-Box Cryptography—Analysis of White-Box AES Implementations" by Yoni De Mulder (February 2014), entire contents of which are hereby incorporated by reference for all purposes in their entirety.

IV. Systems

A. Asset Obfuscation System

FIG. 1 illustrates an example asset obfuscation system 100, in accordance with some embodiments. As illustrated, one or more asset providers 104A-B can communicate with one or more mobile devices 102A-B via communications network 106 so as to deploy obfuscated assets 112A-B onto the mobile devices 120A-B.

An asset provider can be configured to provide any type of digital assets 108A-B such as data, code, cryptographic keys, or any combination thereof. The digital assets 108A-B can be generated by the asset providers and/or received from any suitable third-party providers. In an example, an asset provider can be configured to provision (provide) data to the mobile devices. For example, the asset provider can include a cloud-based payment platform (discussed in FIG. 2) configured to provision account parameters relating to accounts that are usable for conducting transactions, such as account credentials.

Account parameters can include a semi-static set of data and a dynamic set of data, and some or all of the account parameters may be limited-use account parameters. Semi-static set of data may include an identifier that can be used to identify an account associated with the user (e.g., an account identifier such as a primary account number (PAN), an alternate account identifier such as an alternate PAN, or a token that is a substitute for an account identifier, etc.), an expiry date, and/or other account details or data that does not necessarily change for an extended period of time, or in some embodiments, for the lifetime of the account.

The dynamic set of data may include one or more keys, information associated with the one or more keys, and/or other dynamic data that has a limited lifespan, and are repeatedly refreshed or replenished during the lifetime of an account. The dynamic set of data can be used for or relates to on-device generation of dynamic transaction cryptograms, or represent dynamic transaction data during payment transactions. The dynamic set of data may be limited-use in the sense that the dynamic set of data can be used for only a limited time or a limited number of transactions, and may need to be renewed, refreshed, updated, or replenished when the dynamic set of data has exhausted its limited usage. For example, the dynamic set of data may include a limited-use key (LUK) that is used as an encryption key to generate a transaction cryptogram during a transaction. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by a cloud-based payments platform that provides the cloud-based transaction service.

In another example, an asset provider can be configured to provision code or executable instructions to be installed and executed on the mobile devices. The code can include or be included in a mobile application. The asset provider can include a mobile application provider, such as a merchant, an online application store, an issuer, and the like. Note that the mobile application that is provided can include not only executable code, but also any suitable data associated with the executable code such as input/output data, configuration data, and the like. For example, an asset provider can be configured to provide a mobile application 212 and 312 such as discussed in FIGS. 2 and 3, or any component thereof such as the on-device cloud based transaction logic.

An asset provider can be configured to obfuscate some or all of the assets before they are provided to the mobile devices using methods described herein. For example, asset obfuscation may be implemented by the obfuscation module 110A-B or any other suitable module of the asset provider 104A-B. Additionally or alternatively, an asset provider may be configured to provide update obfuscation for an asset that has been previously provided to a mobile device. For example, update obfuscation may be implemented by the obfuscation module 110A-B or any other suitable module of the asset provider 104A-B. The asset provider may apply update obfuscation in an incremental fashion on top of a previous obfuscation scheme. Alternatively, the asset provider may re-obfuscate the asset using a different obfuscation technique. The newly obfuscated asset can be re-deployed the obfuscated asset to the mobile device. In some embodiments, update obfuscation functionalities may be implemented by the obfuscation module 110A-B or any other suitable module of the asset provider 104A-B. Additionally or alternatively, the asset provider may provide update obfuscation instructions to the mobile device, which then update the obfuscation of the previously-received asset based on the instructions.

The mobile devices 102A-B can be configured to receive the obfuscated assets 112A. Depending on the types of the obfuscated assets that are received and/or the obfuscation techniques that have been applied to the assets, the mobile devices may be configured to take different actions with respect to the obfuscated assets. For example, if data is obfuscated, a mobile device may store obfuscated data in a data storage associated with the mobile device. If the data is encrypted or otherwise encoded, the mobile device may decrypt, decode, or otherwise de-obfuscate the data (e.g., prior to using the data). As another example, if code is obfuscated, the mobile device may execute and/or install the obfuscated code. In some embodiments, the obfuscated code may be decoded prior to being executed. In yet another example, where both data and code are obfuscated, the mobile device may de-obfuscate the obfuscated data and provide the de-obfuscated data as input data to the obfuscated code.

In some embodiments, the mobile devices may be configured to obfuscate at least a portion of an asset received from an asset provider. For instance, the mobile device may be configured to obfuscate at least one portion of an asset that may be un-obfuscated or obfuscated to begin with. The mobile device may also be configured to de-obfuscate, partially or completely, at least one portion of the asset that is previously-obfuscated and/or apply updated obfuscation.

Such obfuscation-related functionalities may be performed based at least in part on instructions provided by an asset provider or another suitable entity and/or configuration data or parameters available locally at the mobile device. For instance, a mobile device may be configured to receive instructions from an asset provider that includes everything the mobile device needs to obfuscate a certain asset or a portion thereof. In another example, a mobile device may need to rely on both instructions from an asset provider and locally available information in order to apply the obfuscation. For example, the mobile device may have access to a plurality of obfuscation techniques and/or parameters that are available locally. Instructions from an asset provider may instruct the mobile device which one of the plurality of obfuscation technique to apply to a given asset or a portion thereof or a given type of assets. The instructions may be provided during an initial provisioning of assets or during a subsequent update message using pull and/or push technologies. In another example, a mobile device may be configured to automatically obfuscate at least a portion of an asset without external instructions. Such obfuscation may be triggered by a timer or a counter maintained by the mobile device (e.g., re-obfuscate LUK every 10 days).

The client-side obfuscation-related functionalities discussed herein may be performed by an obfuscation module 114 or any other suitable component of a mobile device 102B. In some embodiments, a mobile device may not be configured to perform any obfuscation functionalities. For example, mobile device 102A does not include an obfuscation module. In some embodiments, some of the obfuscation functionalities may be performed by an intermediate device (not shown) situated between a mobile device and an asset provider.

In general, the allocation of obfuscation functionalities (including initial obfuscation and/or subsequent obfuscation updates) between a mobile device, an asset provider, and/or any intermediate devices may depend on a variety of factors such as security guidelines or concerns, computing resources, network environment, types of assets, types of obfuscation techniques or functionalities, obfuscation parameters, and the like. For example, a first mobile device that is more computationally efficient (e.g., with a better CPU and/or more memory) may be configured to perform more complex obfuscation functionalities than a second mobile device that is less computationally efficient. A first mobile device that is deemed more secure may be configured to perform more obfuscation functionalities than a second mobile device that is deemed less secure. For instance, the first mobile device may be located in a more private or secure network environment (e.g., behind a firewall) whereas the second mobile device may be in a more public or less secure network environment. As another example, the obfuscation functionalities that are more amenable to automation or semi-automation (e.g., operations involving static elements) may be implemented by a mobile device whereas the obfuscation functionalities that are less amenable to automation (e.g., operations involving dynamic elements) may be implemented by an asset provider.

As discussed above, a previously-obfuscated assets or a portion thereof may be updated so as to provide update obfuscation of the asset. The frequency of such updates may be determined based at least in part on a level of strength associated with the obfuscated asset. The strength of obfuscation associated with the obfuscated asset indicates a level of resistance against de-obfuscation efforts on the obfuscated asset (e.g., disclosure, decryption, tampering, cryptanalysis, or reverse engineering) such as by unauthorized entities (e.g., hackers or malicious software). The more resistant the obfuscated asset is to the de-obfuscation efforts, the stronger the obfuscation of the asset is; and vice versa. In general, assets that with greater obfuscation strength may require less frequent update, whereas assets with weaker obfuscation strength may require more frequent updates.

In various embodiments, the strength of the obfuscation can depend on the strength associated with a set of obfuscation techniques used to obfuscate the asset, the order or manner in which the set of obfuscation techniques were applied, the type of asset being obfuscated, and the like. For instance, an asset encrypted using a stronger type of encryption (e.g., two-key triple DES) may have a higher level of obfuscation strength than another asset encrypted using a weaker type of encryption strength (e.g., DES). A cryptographic code that is protected by both white-boxing cryptography and code obfuscation techniques may have stronger obfuscation than a cryptographic code this is only white-boxed or only code-obfuscated. A first piece of data that is encrypted using a first encryption key having a larger size may be consider more strongly obfuscated than a second piece of data that is encrypted using a second encryption key having a smaller size.

In some embodiments, a level of obfuscation strength associated with an obfuscated asset may be indicated at least in part by an estimated length of time it takes to de-obfuscate the asset (also referred to as the "time-to-break"). The time-to-break may be expressed in any suitable format such as minutes, hours, days, weeks, months, years, and the like. The longer time indicates stronger obfuscation strength. The time-to-break may be estimated using empirical data and/or theoretical models. In other embodiments, the obfuscation strength may be indicated by other representations such as alphanumeric strings (e.g., a number from 0 to 10, a character string selected from "high", "medium", or "low", etc.).

Additionally or alternatively, the frequency of such updates may be determined based at least in part on the objectives or requirements, security landscape, computing resources, and other considerations for an asset provider, a mobile device, a network environment, and the like. For example, a mobile device associated with a premium account may receive more frequent updates than a mobile device associated with a regular account. As another example, an asset provider may determine that the length of time to update obfuscation of an obfuscated asset should be twice an estimated time-to-break associated with the obfuscated asset. For example, if the time-to-break associated with the obfuscated asset is 2 weeks, then the time to update obfuscation is determined to be 4 weeks since the deployment of the obfuscated asset or the last obfuscation update to the mobile device. In some embodiments, once an update is deployed, a new time-to-break may be determined (e.g., estimated) for the updated obfuscated asset and a new update time period may be determined based on the new time-to-break.

As another example, the update frequency may be determined based at least in part on a security landscape with respect to the mobile devices and/or obfuscated assets. For example, if there is a known security breach to a mobile device on which an obfuscated asset is deployed, that mobile device may be updated sooner than another device that has not been breached. As another example, if a particular obfuscation technique is known to have been de-obfuscated (e.g., reverse engineered), devices receiving assets that have been obfuscated using the particular obfuscation technique may be updated to use alternative obfuscation techniques.

As another example, the update frequency may be determined based at least in part on a computing resources available at the asset provider and/or mobile devices. For example, an asset provider may be configured to provide more frequent updates when more computing resources are available to the asset provider; and vice versa. Similarly, a mobile device may be configured to receive more frequent updates when more computing resources are available to the mobile device; and vice versa.

B. Cloud-Based Transaction System

The asset obfuscation techniques can be used to protect mobile applications, account parameters, or other data provisioned to mobile devices in a cloud-based transaction system. In particular, the techniques can be used to enhance the security of a communication device (e.g., a mobile device) that may or may not have a secure element, because the techniques do not require the use of a secure element to safeguard assets.

Figure 2:
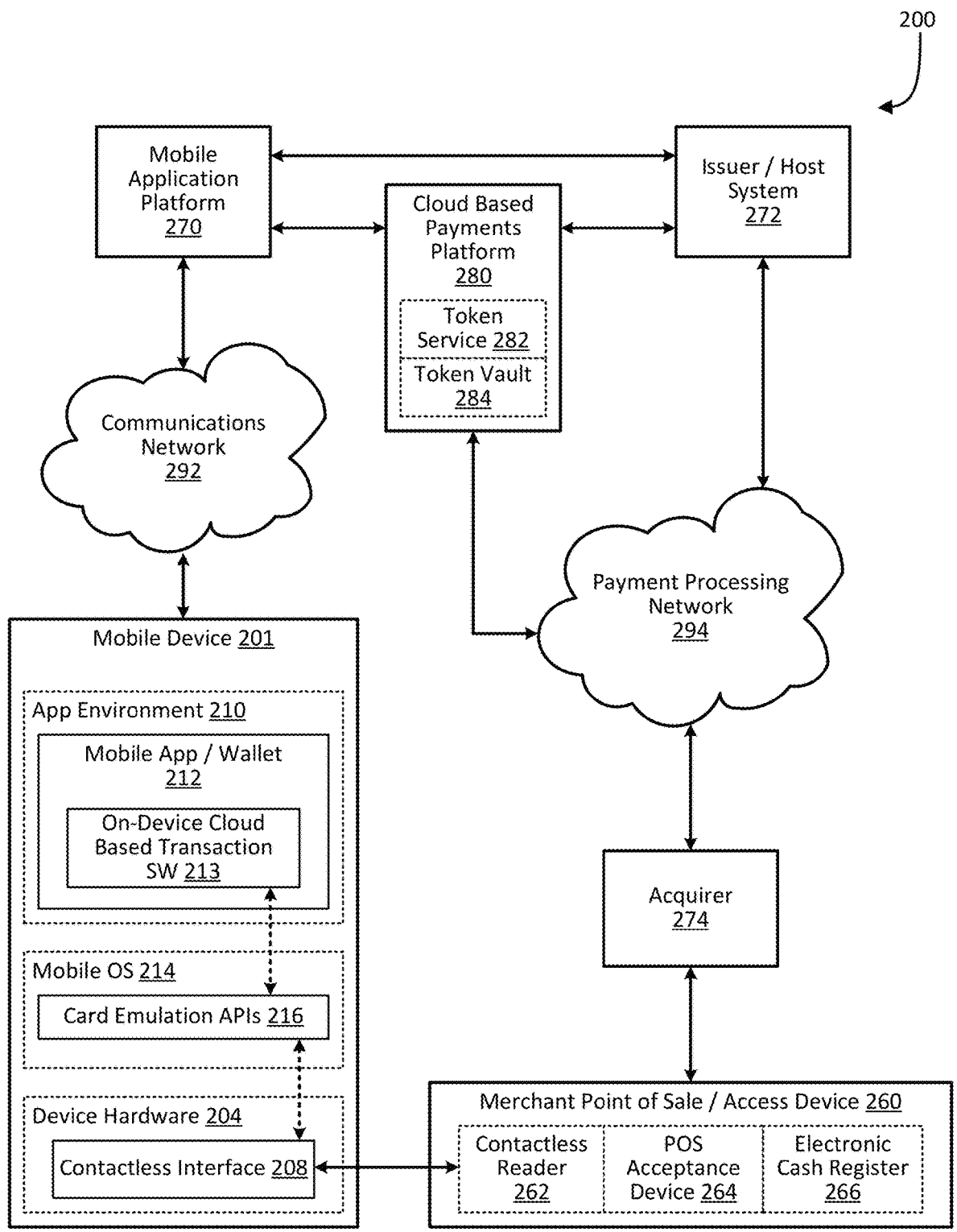
FIG. 2 illustrates an example cloud-based transaction system, in accordance with some embodiments.

FIG. 2 illustrates an example cloud-based transaction system 200, in accordance with some embodiments. In some embodiments, assets used in the cloud-based transaction system 200 (e.g., mobile application 212 or a portion thereof) may be obfuscated and/or deployed using the techniques described herein. The core components of system 200 may include a cloud-based payments platform (CBPP) 280 and a mobile application platform (MAP) 270 to manage cloud-based transactions conducted using mobile device 201. CBPP 280 may be referred to as a remote computer, and may be implemented using one or more computing devices or computers, such as one or more server computers, and can be associated with or be operated by a cloud-based service provider such as an issuer, payment processor, and/or other suitable entities. CBPP 280 may manage cloud-based accounts, provide verification functions for cloud-based transactions, manage lifecycle messages from issuer/host system 272 or MAP 270, as well as initiate lifecycle management events. CBPP 280 may also assist issuer/host system 272 with post payment functionalities to mitigate the risk against counterfeit account parameters, and limit the exposure on account parameters stored on the device. For example, CBPP 280 can be used to facilitate issuer/host system 272 requests for periodic post payment verification of payment transactions and/or validation of account parameters replenishment requests using post payment information.

CBPP 280 may also implement a set of key management functions that manages issuer master derivation keys (MDKs) from which the limited-use keys (LUKs) for cloud-based transactions are derived. CBPP 280 may implement a set of provisioning functions that manages the preparation and delivery of cloud-based account parameters (e.g., alternate account identifier or token, initial LUK and associated key index, etc.) to MAP 270 for the initial setup of the mobile application 212 on mobile device 210. CBPP 280 may also manage the cloud-based accounts for processing by issuer/host system 272, and may perform active account management functions such as functions to generate account parameters based on requests or the risk profile of the cloud-based account per CBPP 280 risk management parameters. CBPP 280 may also maintain the account status for each cloud-based account, and manage the replenishment or refreshing of the account parameters.

In some embodiments, CBPP 280 may also implement or be provided with access to a token service 282 and/or a token vault 284. Token service 282 can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 282 may manage the deployment and usage of the tokens according to their use restrictions. Token service 282 may be in communication with token vault 284 where the generated tokens are stored. Specifically, token vault 284 may maintain a mapping between a token and the real account identifier (e.g., PAN) represented by the token. During transaction processing, token vault 284 may be queried to retrieve the real account identifier or PAN associated with the token.

MAP 270 is used to facilitate communications between mobile application 212 executing on mobile device 201 and other entities in cloud-based transactions system 200 such as CBPP 280 and/or issuer/host system 272, etc. MAP 270 may communicate with mobile device 201 via a communications network 292 such as the Internet. In some environments, mobile device 201 may not always have constant network connectivity, and thus one of the primary roles of MAP 270 is to intermediate requests between mobile application 212 and the other entities in the cloud-based transactions system 200 to ensure that requests and responses involving mobile application 212 are fulfilled as soon as network connectivity to mobile device 201 is established. MAP 270 may be referred to as a remote computer, and may be implemented using one or more computing devices or computers such as one or more server computers, and can be associated with or be operated by the provider of mobile application 212. The provider of mobile application 212 can be, for example, an issuer, a bank, a third-party mobile wallet provider, a merchant, or other suitable entities. In some embodiments, MAP 270 can be associated with or be operated by the same entity as CBPP 280, or they can be separate. Although MAP 270 is illustrated as a separate logical entity in FIG. 2 because CBPP 280 is not expected to communicate directly with mobile devices, it should be understood that in some embodiments, some or all of the functionalities of MAP 270 may be integrated as part of CBPP 280. Examples of MAP 270 may include mobile banking platforms and mobile wallet platforms.

In some embodiments, MAP 270 may implement authentication functionalities to authenticate mobile device 201 when mobile device 201 communicates with the other entities in cloud-based transaction system 200 via MAP 270. The authentication functionalities may ensure that a mobile device communicating with the system is an authorized mobile device and/or a mobile device that has not been hacked, infected with malware or virus, or otherwise been compromised. For example, MAP 270 may perform, request, or facilitate a device fingerprint of mobile device 201 to capture the state of mobile device 201 when mobile device 201 communicates with MAP 270. The device fingerprint may, for example, capture information about mobile device 201 such as the operating system and version, applications installed on mobile device 201, memory usage, whether mobile device 201 has been jail-broken, device identifiers such as a mobile device identifier, and/or other suitable device characteristics.

MAP 270 may verify the device fingerprint of mobile device 201 for each communication session established with mobile device 201 or periodically (e.g., once every five communication sessions, once a month, etc.). If the device fingerprint of a mobile device indicates that the mobile device is not an authorized device for an account (e.g., the mobile device requesting replenishment of account parameters is a different device than the original device that was used to enroll the account), or if the device fingerprint indicates that the mobile device may potentially be hacked, MAP 270 may prevent the mobile device from communicating with the system and alert the issuer that the mobile device may have been compromised.

MAP 270 may perform enrollment functions to enroll a mobile cardholder into a cloud-based transactions program, and a set of provisioning functions that facilitates the preparation and delivery of the account parameters, configuration, and cloud-based payments device threshold parameters to mobile application 212. MAP 270 may perform account parameters replenishment functions to facilitate the account parameter replenishment process for the cloud-based account provisioned on mobile device 201, and lifecycle management functions that manage lifecycle messages from issuer/host system 272, CBPP 280, and/or mobile application 212. MAP 270 may also perform post-payment functions to mitigate the risk against counterfeit account parameters, and to limit the exposure on account parameters stored on mobile device 201, such as facilitating periodic post payment verification of payment transactions or the use of post payment information to validate account parameters replenishment requests.

In cloud-based transactions system 200, mobile device 201 can be used to conduct cloud-based transactions facilitated by CBPP 280 and/or MAP 270. The components in mobile device 201 may include device hardware 103, a mobile operating system (OS) 214, and an applications environment 210 in which mobile application 212 may reside. Device hardware 204 may include a contactless interface 208 that can interact with a contactless reader 262 of an access device 260. Examples of contactless interface 208 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface 208 may include an optical interface (e.g., a display screen) to present payment information in the form of an image such as a quick response (QR) code, or bar code, etc. to contactless reader 262 of access device 260 when contactless reader 262 includes an optical code scanner or reader.

Applications environment 210 of mobile device 201 may host a mobile application 212 provided by a mobile application provider. For example, if the provider of mobile application 212 is an issuer, mobile application 212 may be a mobile banking application or a separate mobile payment application. If the provider is a mobile wallet provider such as a mobile network operator or third-party wallet provider that supports multiple issuers, mobile application 212 may be a mobile wallet application. For merchants, mobile application 212 may be a merchant's own mobile application from which consumers can conduct e-commerce or point of sale transactions with that merchant, or may be a mobile wallet application that supports multiple merchants.

According to some embodiments, mobile application 212 may include on-device cloud-based transaction software 213 (e.g., can be in the form of a software developer kit (SDK)) integrated into mobile application 212 to support cloud-based transaction functionalities. The on-device cloud-based transaction software 213 may perform functions to facilitate cloud-based transactions such as to take the account parameters (e.g., LUK and associated key index), generate transaction cryptograms, and deliver them to mobile operating system 214 for transmission over contactless interface 208. The on-device cloud-based transaction software 213 may also manage the initial service profile parameters (e.g., limited-use thresholds) that are provided after an account has been provisioned to ensure that requests for account parameter replenishment and other account parameter management activities are initiated.

Mobile application 212 may perform functions to manage the risk profile of the cloud-based account, maintain the account status, and replenish account parameters for each cloud-based account based on the on-device threshold management parameters. Mobile application 212 may also manage lifecycle messages from issuer/host system 272 or lifecycle messages from MAP 270. Mobile application 212 may perform a set of functions to enroll a mobile cardholder into a cloud-based transactions program, and a set of functions that manages the receiving and configuration of the cloud-based account parameters and cloud-based payments device threshold parameters received from MAP 270. Mobile application 122 may also provide consumer device cardholder verification method (CDCVM) functions for cloud-based transactions, and perform a set of functions that processes and responds to messages in support of post-payment processing to limit the exposure of account parameters stored on the mobile device. For example, post-payment processing may include periodic post-payment verification of payment transactions or using post-payment information to validate account parameters replenishment requests.

In secure element based implementations, a contactless application (e.g., a mobile wallet or payment application for contactless transactions) using a contactless interface to communicate with a contactless reader of an access device would have to be coded for and be executed on a secure element in order to gain access to the contactless interface. In some embodiments, mobile device 201 may include a mobile operating system (OS) 214 that implements a set of card emulation application programming interfaces (APIs) 216 such as host card emulation (HCE) APIs to allow mobile application 212 to gain access to contactless interface 208 without requiring the use of a secure element. For example, card emulation APIs 216 may be coded for and be executed from mobile OS 214 of mobile device 201, and may include programming function calls to allow mobile application 212 to receive, process, and respond to transaction communications such as Application Protocol Data Unit (ADPU) commands sent from contactless reader 262. In this manner, mobile device 201 is able to conduct contactless transactions without requiring access to a secure element on mobile device 201.

Once mobile device 201 and mobile application 212 have been provisioned with the account parameters, mobile device 210 can conduct cloud-based transactions by interacting with contactless reader 262 of access device 260 (e.g., at a merchant point-of-sale (POS) location). Contactless reader 262 may include one or more RF transceivers that can send and receive communications using NFC or other radio frequency or wireless communication protocols such as Bluetooth, BLE, Wi-Fi, iBeacon, etc. In some embodiments, contactless reader 262 may include an optical code scanner or reader to conduct transactions using QR codes, bar codes, etc. Access device 260 may also include a POS acceptance device 264 and/or electronic cash register 266.

To conduct a cloud-based transaction, a user of mobile device 201 may place mobile device 201 in proximity to contactless reader 262 of access device 260, or display an image such as a QR code or bar code on a screen of mobile device 201 for scanning by contactless reader 262 of access device 260. Mobile device 201 may provide access device 260 with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from an LUK). For example, in some embodiments, an account identifier or token, and additional information (e.g., a transaction cryptogram, account parameters, etc.) can be transmitted to access device 260 in ABDU responses that are responsive to a series of ABDU commands received from access device 260. In some embodiments, an account identifier or token, and the additional information can be encoded in a QR code or bar code that is scanned and processed by access device 260 to retrieve the encoded information. Access device 260 or a merchant computer coupled to access device 260 may then generate an authorization request message including the account identifier or token, and additional information such as a transaction cryptogram and other transaction data, and forward the authorization request message to acquirer 274 associated with the merchant. The authorization request message can then be sent by acquirer 274 to payment processing network 294.

Payment processing network 294 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Upon receiving the authorization request message, payment processing network 294 may forward the authorization request message received from acquirer 274 to the corresponding issuer/host system 272 of the account of the user of mobile device 201. After issuer/host system 272 receives the authorization request message, the authorization request message may be parsed, and the information in the authorization request message may be verified. For example, issuer/host system 272 may verify that the transaction cryptogram was generated by a valid LUK, and that the set of one or more limited-use thresholds associated with the LUK has not been exceeded. In some embodiments, some or all of the information in the authorization request message can also be sent to CBPP 280 for verification and processing. For example, if issuer/host system 272 does not have the capability to verify the transaction cryptogram, the payment processing network 294 or issuer/host system 272 may forward the transaction cryptogram to CBPP 280 for verification.

An authorization response message is then sent back to payment processing network 294 to indicate whether the current transaction is authorized (or not authorized). Payment processing network 294 then forwards the authorization response message back to acquirer 274. In some embodiments, payment processing network 294 may decline the transaction even if issuer/host system 272 has authorized the transaction, for example, depending on a value of a fraud risk score or depending if limited-use account parameters are verified by CBPP 280. Acquirer 274 then sends the authorization response message to the merchant computer and/or access device 260. The authorization response results, which may include transaction data for the transaction can be displayed by access device 260, or be printed out on a physical receipt.

At the end of the day, a clearing and settlement process can be conducted by payment processing network 294. A clearing process is a process of exchanging financial details between an acquirer and an issuer to facilitate posting to a user's payment account and reconciliation of the user's settlement position. It should be understood that any of the acquirer 274, payment processing network 294, issuer/host system 272, CBPP 280, and/or MAP 270 may be referred to as a remote computer, and may include one or more computing devices such as one or more computers or server computers to enable the entity to communicate with the other entities in system 200, and/or to perform one or more of the functions described herein.

V. Devices

A. Mobile Device

Figure 3:
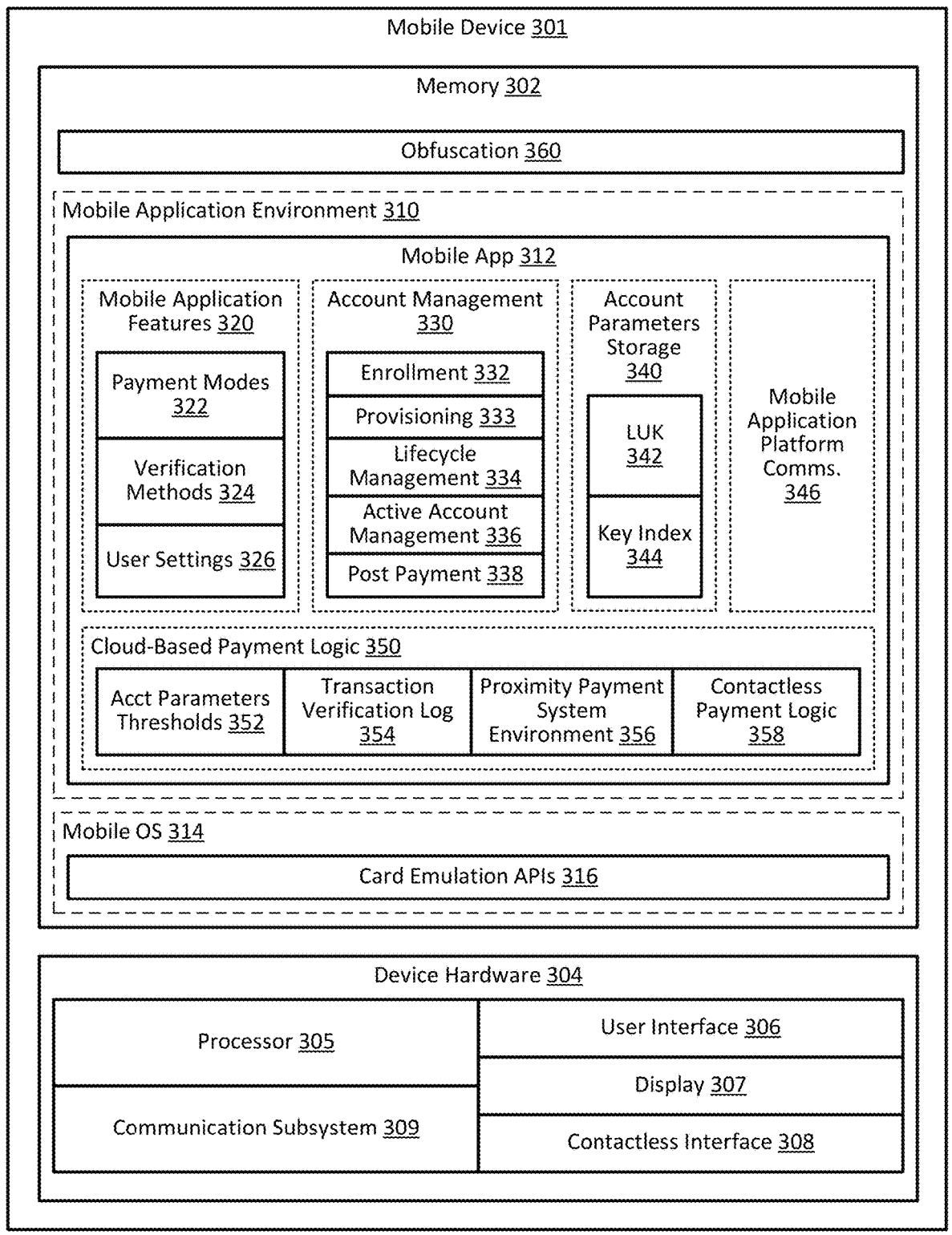
FIG. 3 illustrates example components of a mobile device, in accordance with some embodiments.

FIG. 3 illustrates example components of a mobile device 301, in accordance with some embodiments. The mobile device 301 may include device hardware 304 and memory 302. Device hardware 304 may include a processor 305, a communications subsystem 309, a use interface 306, a display 307 (which may be part of user interface 306), and a contactless interface 308. Processor 305 can be implemented as one or more integrated circuits (e.g., one or more single core or multicore microprocessors and/or microcontrollers), and is used to control the operation of mobile device 301. Processor 305 can execute a variety of programs in response to program code or computer-readable code stored in memory 302, and can maintain multiple concurrently executing programs or processes. Communications subsystem 309 may include one or more RF transceivers and/or connectors that can be used by mobile device 301 to connect with external networks (e.g., communication network 292) and communicate with other devices. User interface 306 can include any combination of input and output elements to allow a user to interact with and invoke the functionalities of mobile device 301. In some embodiments, display 307 may be part of user interface 306.

Contactless interface 308 may include one or more RF transceivers to interact with a contactless reader of an access device. In secure element based implementations, only the secure element may have access to contactless interface 308. In the cloud-based payments techniques described herein, contactless interface 308 can be accessed by the mobile OS 314 without requiring the user of a secure element. In some embodiments, display 307 can also be part of contactless interface 308, and is used, for example, to perform transactions using QR codes, bar codes, etc.

Memory 302 can be implemented using any combination of any number of non-volatile memories (e.g., flash memory) and volatile memories (e.g., DRAM, SRAM), or any other non-transitory storage medium, or a combination thereof media. Memory 202 may store a mobile OS 314 and a mobile application environment 310 where one or more mobile applications reside including mobile application 312 (e.g., a mobile wallet application, mobile payment application, etc.) to be executed by processor 305. Mobile OS 314 may implement a set of card emulation APIs 316 that can be invoked by mobile application 312 to access contactless interface 208 to interact with an access device.

Optionally, the memory 302 may also store an obfuscation module 360 configured to implement obfuscation functionalities described herein. For instance, the obfuscation module 360 may be configured to obfuscate or de-obfuscate any asset on the device such as a mobile application 312 or a portion thereof. The mobile application 312 may be obfuscated to protect stored keys using obfuscation techniques such as white-box cryptography. Code and data in the mobile application 312 may be obfuscated in order to protect the data against disclosure and/or the code against reverse engineering.

In some embodiments, the obfuscation module 360 may be configured to perform asset obfuscation functionalities described herein based at least in part on instructions provided by an external entity (e.g., an asset provider). For instance, the instructions may instruct the obfuscation module to update obfuscation for a portion of the mobile application 312. The obfuscation module 360 may be configured to perform the obfuscation functionalities without instructions from an external entity. The obfuscation of the mobile application 312 or a portion thereof may be based at least in part on a combination of obfuscation parameters specific to the mobile device such as account attributes, time parameter, device attributes, and the like. While the obfuscation module 360 is shown as a module outside the mobile application environment 310, in some embodiments, the obfuscation module 360 may reside in the mobile application environment 310. The obfuscation module 360 may be provided as a part of a mobile application 312.

For cloud-based payments implementations, the payment system environment (e.g., PPSE) and mobile payment application functionalities are consolidated into mobile application 312, whereas secure element based implementations may provide some or all of these functionalities from a secure element. Mobile application 312 may include cloud-based payments logic 350. Cloud-based payments logic 350 may include contactless payment logic 358, proximity payment system environment (PPSE) logic 356, transaction verification log 354, and account parameters thresholds 352 (e.g., set of one or more limited-use thresholds associated with LUK 342). Contactless payment logic 358 may include functionalities that enable contactless communications to carry out to conduct a contactless transaction with a contactless reader of an access device. PPSE logic 356 is used to inform the access device which payment product is available on mobile application 312. The access device then uses this information to select the payment account to initiate a contactless transaction. Transaction verification log 354 can be used for post-payment support. Mobile application 312 may maintain transaction verification log 354 (can be hidden from the consumer) retaining transaction details for transactions initiated from mobile application 312. Mobile application 312 may also use the transaction verification log 354 to support active account management processes and post payment interactions. Account parameters thresholds 352 (e.g., limited-user thresholds) are initially configured and can potentially be updated with different thresholds to inform mobile application 312 when to initiate a request for updated account parameters (e.g., time-to-live, number of transactions, cumulative transaction amount, etc.).

Mobile application 312 may also include account parameter storage 340 and mobile application platform (MAP) communications logic 346. Account parameter storage 340 stores the account parameters (e.g., account identifier or alternate account identifier or token, LUK 342, key index 344, etc.) that are used to initiate a cloud-based payment transaction. MAP communications logic 346 is used to enable secure communications with a mobile application platform (MAP) in order to request, send, and receive information to manage a user's cloud-based payment accounts. This may include logic to consume and process information for account management logic 330.

Account management logic 330 includes logic to process information for the cloud-based payments services such as enrollment logic 332, provisioning logic 333, active account management logic 336, lifecycle management logic 334, and post payment interactions logic 338. Enrollment logic 332 includes logic for a consumer to initiate the enrollment of an account to the cloud-based payment service. Provisioning logic 333 includes logic to process the issuer data to configure the account into mobile application 312, including the provisioning of the initial account parameters. Active account management logic 336 can be used to initiate a request with MAP to update the account parameters when account parameter thresholds have been exceeded. Lifecycle management logic 334 may include logic to initiate and process account lifecycle events such as consumer initiated delete, issuer-initiated delete, issuer-initiated suspend, and/or issuer-initiated resume, etc. Post payment interactions logic 338 is used to support payment verification. Post payment interactions logic 338 may include logic to receive and respond to requests from MAP for transaction verification log 354. Post payment interactions logic 238 can also be used to support account parameters replenishment, and may include logic to extract required information from transaction verification log 354 to send to MAP as part of an account parameter replenishment request.

Mobile application 312 may also include mobile application features 320. Mobile application features 320 may include consumer verification methods (CVM) logic 324, payment modes 322, and user settings 326. CVM logic 324 may include logic required to confirm a mobile application passcode or on-device verification method (e.g., screen lock), or other verification information method supported by mobile application 312. Payment modes 322 may include logic to support various ways of setting up mobile application 312 and mobile device 301 to be ready to initiate a transaction, and may include support for Manual Mode and/or Always-On Mode.

Manual Mode is a state where mobile application 312 is configured to be accessible for making a payment after the consumer has explicitly chosen to (1) open mobile application 312, (2) entered user input for a consumer verification method if required, and (3) selected an account to make a contactless payment transaction and for a single transaction or limited time. For Manual Mode, a decision can be made whether a consumer device cardholder verification method (CDCVM) will be required prior to making payment. If a CDCVM is used, then the two-tap scenario for high-value transactions may not be necessary. Conversely, to reduce barriers to use, if an issuer decides to opt for not asking for a CDCVM in Manual Mode, then the consumer will be able to conduct transactions once the conditions for Manual Mode operation are met. In this latter scenario, mobile application 312 may support entry of CDCVM if a CDCVM is requested during a high value payment.

Always-On Mode is a state where an account on mobile device 312 (a default account) is intended to be continuously accessible to a contactless reader. A mobile device with an account set in this state allows a consumer to initiate a contactless payment transaction by the presentation of the mobile device to a contactless reader. Always-On Mode may also support device verification (referred to below Always-On with On-Device Verification Mode). This setting allows for additional security. For example, the user may have to unlock the mobile device's user interface or display screen before mobile application 312 responds to a contactless reader attempting to initiate payment transaction.

B. Asset Provider Server

Figure 4:
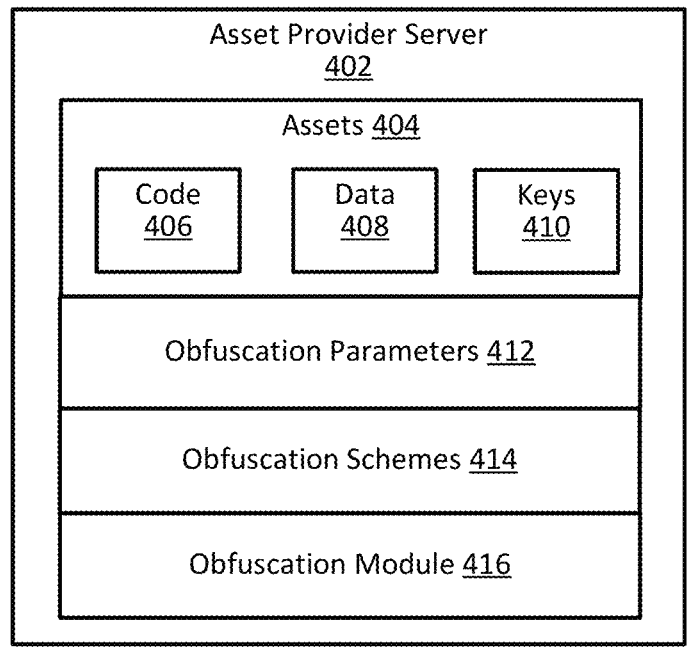
FIG. 4 illustrates example components of an asset provider server, in accordance with some embodiments.

FIG. 4 illustrates example components of an asset provider server 402, in accordance with some embodiments. The asset provider server 402 can be configured to obfuscate assets and provide obfuscated assets to mobile devices such as the mobile devices discussed in FIGS. 1-3. Additionally, the asset provider server 402 can be configured to cause update to previously obfuscated assets. The asset provider server 402 can include one or more assets 404, one or more obfuscation parameters 412, one or more obfuscation schemes 414, and an obfuscation module 416.

The assets 404 can include any digital information that can be obfuscated and transmitted from one device to another device such as discussed in section I. Any of the assets 404 may be generated by the asset provider server 402 or generated by another entity but made available to the asset provider server 402. Assets 404 can include code 406, data 408, cryptographic keys 410, or a combination thereof. For instance, an asset can include a mobile application or a portion thereof.

The code 406 can include one or more executable instructions or programs that may be executed by a computer to perform certain tasks. Examples of codes can include programs for implementing a cryptographic algorithm (e.g., a cipher) for encryption and/or decryption, for initiating and/or processing payment transactions, for managing account information, or any other functionality. In some embodiments, code may include or be included in a software development kit (SDK) that is used to create applications and/or integrated in an application.

Examples of data 408 can include input or output data for code or applications, configuration data for mobile applications, mobile devices, or accounts, account or credential parameters (e.g., PAN and expiration date), transaction data (e.g., transaction timestamp, transaction amount, transaction type indicator, transaction device identifier), and user data (e.g., user preferences or user profile data), and the like. In some embodiments, data can include derivation parameters or instructions used to derive keys such as a cryptographic nonce (e.g., a random number).

Keys 416 can include any information that is used in a cryptographic algorithm to transform input data into another representation. In some embodiments, keys can include limited use keys (LUKs) that can be used only in a limited fashion (e.g., for a limited duration, for a limited number of times, in a limited context, etc.). Keys can include symmetric or asymmetric (e.g., private/public) keys. Keys may be static or dynamically generated and/or replenished. In some cases, keys may be used, in conjunction with a cryptographic algorithm, to protect data in storage and/or in transit. In some cases, keys (e.g., an LUK) may be used to derive other keys or cryptograms that may be used to conduct transactions.

The obfuscation parameters 412 can include any information that can be used to facilitate the obfuscation of assets. In some embodiments, obfuscation parameters can include account attributes, time parameters, device parameters, or any other suitable parameters such as discussed above in section II. In some embodiments, a mobile device may be associated with one or more accounts, each with corresponding account attributes. Account attributes can include attributes related to an account such as a payment account. Examples of account attributes can include an account identifier (e.g., a PAN or a token) or a range of account identifiers, an issuer of the account, an account holder identifier, a credit limit, an expiration date, a geographic region, a risk score, and the like associated with an account.

The obfuscation schemes 414 can include any of the obfuscation schemes discussed in section III such as encryption schemes, code obfuscation schemes, white-box cryptography schemes, and the like.

The obfuscation module 416 can be configured to perform the asset obfuscation functionalities discussed herein. For example, the obfuscation module can be configured to determine a set of obfuscation parameters associated with a deployment group comprising one or more mobile devices, apply one or more obfuscation techniques to an asset based on the set of obfuscation parameters to generate an obfuscated asset and causing the obfuscated asset to be deployed to the one or more mobile devices. Additionally, the obfuscation module 416 can be configured to cause application of updated obfuscation to the deployed asset at a time that is determined based on an indicator of the strength of the obfuscated asset. For instance, the obfuscation module 416 may update obfuscation of a previously-obfuscated asset based at least in part on the set of obfuscation parameters and deploy the updated asset to the mobile device. Alternatively, the obfuscation module 416 may provide instructions to the mobile devices so as to cause mobile devices to obfuscate the deployed assets there or portions thereof on the mobile devices. For instance, the instructions may indicate the obfuscation techniques to be used, obfuscation parameters to be used, assets to be obfuscated, and any other information.

VI. Obfuscation Methods

According to embodiments, assets may be obfuscated using customized obfuscation schemes that are determined based on a specific combination obfuscation parameters unique to a group of mobile devices. As such, the risk of large-scale attacks on a broad range of devices can be reduced.

A. Deployment Groups

Figure 5:
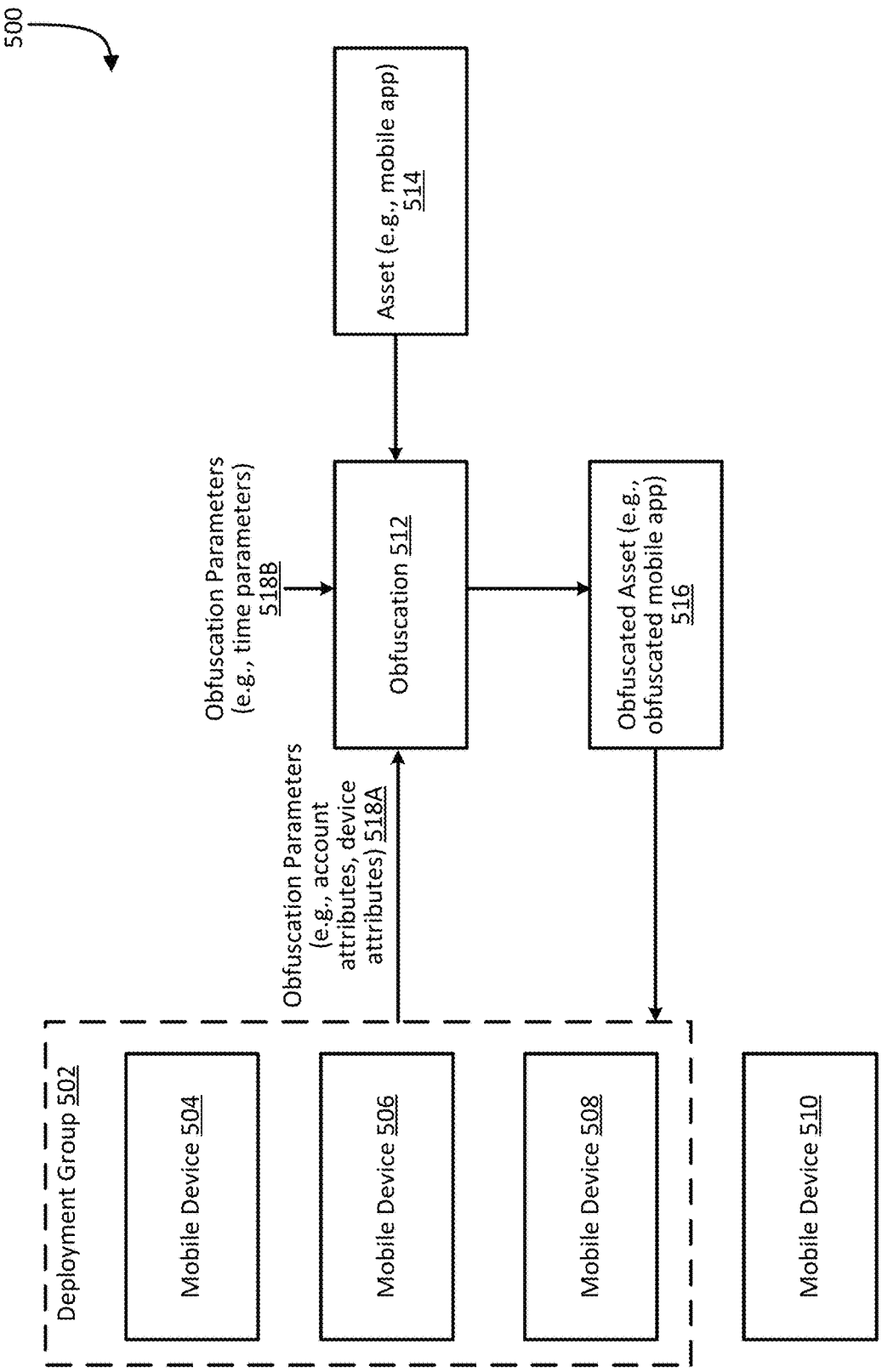
FIG. 5 illustrates an example process for asset obfuscation, in accordance with some embodiments.

FIG. 5 illustrates an example process 500 for asset obfuscation, in accordance with some embodiments. As illustrated, an asset 514 (e.g., a mobile application or a portion thereof) is to be deployed onto mobile devices 504-508 of a deployment group. The deployment group can include a subset of a plurality of mobile devices 504-510. The deployment group may be identified based on a set of common obfuscation parameters 518A comprising account attributes and/or device attributes shared among the one or more mobile devices within the deployment group. Additionally or alternatively, the deployment group may be identified based on other common attributes shared among the mobile devices within the deployment group such as a geographic region.

The asset 514 may be obfuscated by an obfuscation process 512 based at least in part on the obfuscation parameters 518A related to the mobile devices within the deployment group and/or other obfuscation parameters 518B indicating an obfuscation strength such as one or more time parameters 518B. The time parameters may indicate an estimated time to "break" or de-obfuscate the obfuscated asset and/or a time till the next obfuscation update. Based on the obfuscation parameters 518A-B, one or more customized obfuscation schemes may be determined and applied to the asset 514 to generate the obfuscated asset 516. The obfuscated asset 516 can then be deployed to the mobile devices within the deployment group 502.

B. Obfuscation for Deployment Groups Using Account Attributes

Figure 6:
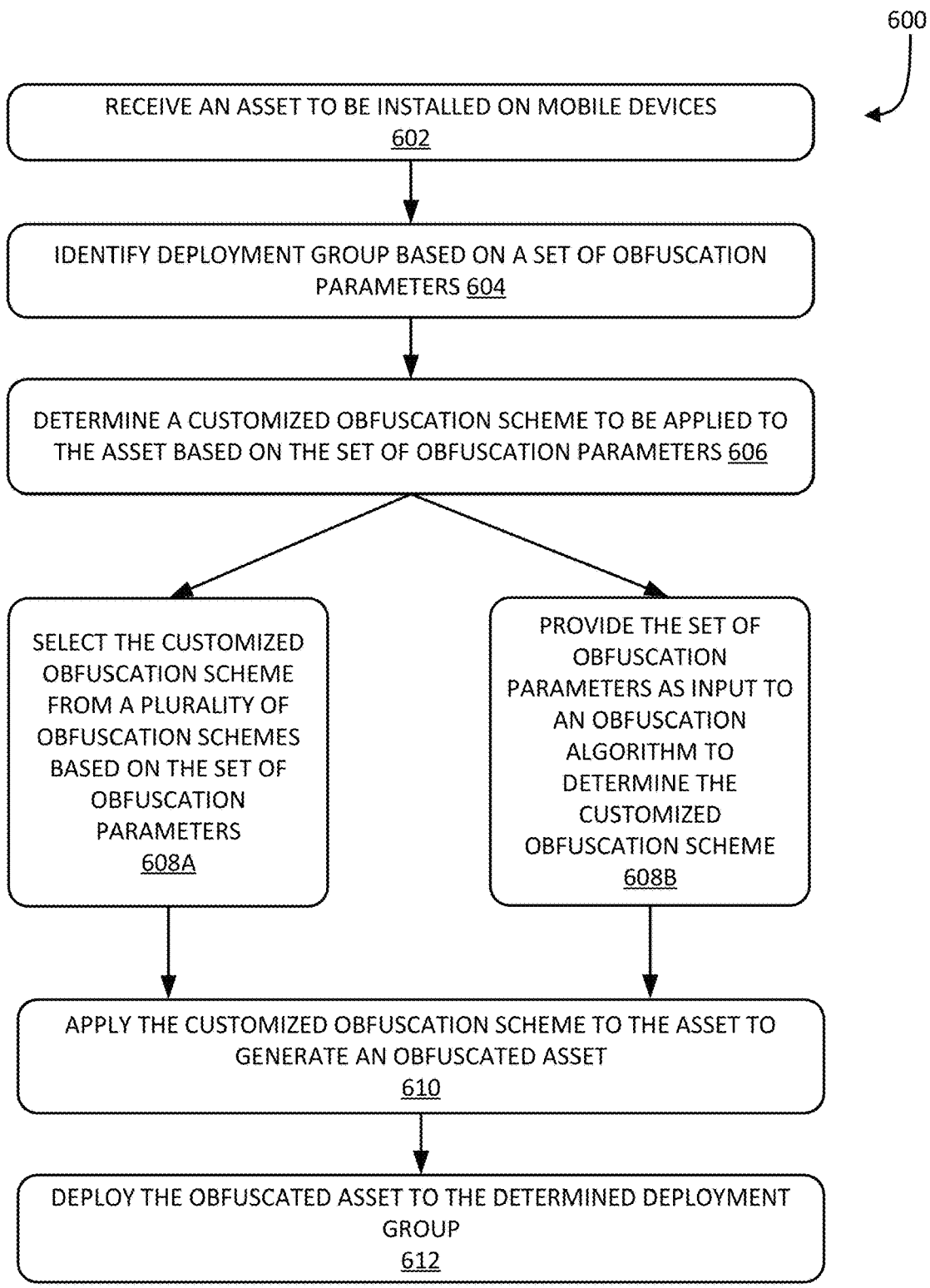
FIG. 6 illustrates an example process for asset obfuscation, in accordance with some embodiments.

FIG. 6 illustrates an example process 600 for asset obfuscation, in accordance with some embodiments. Aspects of the process 600 can be implemented by an asset provider discussed herein. For instance, the process 600 can be implemented by an obfuscation module 110A, 110B, or 416 of FIGS. 1 and 4, respectively. Alternatively or additionally, aspects of the process 600 may be performed by a mobile device discussed herein. For instance, the process 600 can be implemented by an obfuscation module 114 or 360 of FIGS. 1 and 3, respectively. Some or all aspects of the process 600 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 602, process 600 can include receiving an asset to be installed on a plurality of mobile devices. The asset can include a mobile application or a portion thereof (e.g., an SDK) and may include code, data, and/or cryptographic keys. The plurality of mobile devices can include any arbitrary set of mobile devices such as all mobile devices within a geographic region, mobile devices with a certain type of operating system, mobile devices with a certain carrier, and the like. Each of the plurality of mobile devices may be associated with a corresponding account, each account can have account attributes, such as account identifier or identifier range, issuer, account holder, credit limit and the like. In some cases, a mobile device may be associated with more than one account. Thus, account attributes associated with a mobile device includes account attributes associated with one or more accounts for the mobile device.

At block 604, a deployment group for deploying the asset may be identified based at least in part on a set of one or more obfuscation parameters. The deployment group may be a subset of plurality of devices above that share a common set of obfuscation parameters. For instance, the set of obfuscation parameters can comprise one or more account attributes shared among the one or more mobile devices within the deployment group, such as an account identifier, a range of account identifiers, an issuer, an account holder, a credit limit, and the like. In some cases, the obfuscation parameters can also comprise common device characteristics associated with the one or more mobile devices such as an operating system. Additionally or alternatively, the set of obfuscation parameters can comprise a time parameter that indicates a desired level of strength associated with the obfuscated asset. For example, the time parameter can indicate an estimated time to de-obfuscate the obfuscated asset. A shorter time may indicate that a weaker form of obfuscation is needed. Likewise, a longer time may indicate that a stronger form of obfuscation is needed.

At block 606, one or more customized obfuscation schemes to be applied to the asset can be determined based at least in part on the set of obfuscation parameters. In some embodiments, the parameters used to identify the deployment group may be identical or overlap with the parameters used to determine the customized obfuscation schemes. In some other embodiments, the parameters used to identify the deployment group may not overlap with the parameters used to determine the customized obfuscation schemes.

In some embodiments, determining the customized obfuscation schemes in block 606 can be performed in various ways. For example, at block 608A, the customized obfuscation schemes from a plurality of obfuscation schemes can be selected based at least in part on the set of obfuscation parameters. For instance, the selection of the obfuscation schemes may be based on account attributes. As an example, assets for accounts within a particular PAN or token range and/or associated with a particular issuer may be obfuscated using a selected subset of obfuscation schemes; whereas assets for accounts within a different PAN or token range and/or associated with a different issuer may be obfuscated using a different subset of obfuscation schemes. As another example, assets for accounts with a risk score falling within a certain risk score range may be obfuscated using a particular subset of obfuscation schemes. Additionally or alternatively, the selection of the obfuscation techniques may be based on a time parameter, device attributes, and/or other obfuscation parameters. In some embodiments, the obfuscation parameters can be combined (e.g., concatenated and/or hashed) to generate an identifier. The identifier may be used to select a subset of the obfuscation schemes to use.

Additionally or alternatively, determining the customized obfuscation schemes in block 606 can comprise providing, at block 608B, the set of obfuscation parameters as an input to one or more obfuscation algorithms to determine the corresponding customized obfuscation schemes. For example, the obfuscation parameters can be combined (e.g., concatenated and/or hashed) or otherwise processed to generate an identifier. The identifier or a derivation thereof may be used as a key for a specific obfuscation algorithm (e.g., a cryptographic algorithm such as DES or AES). Thus, a customized obfuscation scheme is specified by the particular combination of input and the obfuscation algorithm. The key may be unique for the deployment group and the customized obfuscation scheme(s) using the unique key can be considered customized or unique for the specific combination of obfuscation parameters and deployment group.

In some embodiments, a correspondence between a given combination of obfuscation parameters and the corresponding customized obfuscation schemes is deterministic. Thus, given a particular combination of obfuscation parameters or an identifier thereof, the same set of corresponding customized obfuscation schemes can be identified at a later time. Varying the combination of obfuscation parameters may result in different obfuscation schemes. In some embodiments, the correspondence between obfuscation parameter combinations and obfuscation scheme sets may be stored in a map, table, or any other suitable data structure in a data store associated with an asset provider, mobile device, or the like.

In some embodiments, determining the customized obfuscation schemes can include determining one or more categories or type of information to be obfuscated. Different types of information (e.g., code, data, or cryptographic keys) may require different obfuscation schemes. In some embodiments, an asset may have different portions of different types. For instance, the asset can include a first portion of code, a second portion of data, and a third portion of keys. Based on the categories or types, different assets or portions of the asset may be obfuscated using different obfuscation schemes, such as discussed in section III. For instance, one or more encryption schemes may be used to obfuscate an asset or a portion thereof that comprises data, code obfuscation schemes and/or white-box cryptography may be used to obfuscate an asset or a portion thereof that comprises code, white-box cryptography and/or encryption may be used to obfuscate an asset or a portion thereof that comprises cryptographic keys, and so on.

In some embodiments, determining the customized obfuscation schemes can include determining an extent to which the obfuscation schemes are applied to the asset based on an indicator of the obfuscation strength associated with the obfuscated asset. An example of the indicator of obfuscation strength can include a time parameter that indicates an estimated time to de-obfuscate the obfuscated asset and/or a time till the next time to update the obfuscation. The extent or scope of the obfuscation can include the types of information (e.g., code, data, and/or keys) to be obfuscated and/or the amount of information to be obfuscated within a given type. Thus, determining the customized obfuscation schemes can include determining the types of information to obfuscation. Additionally or alternatively, determining the customized obfuscation schemes can include determining a level of obfuscation for a given type of information based on an indicator of obfuscation strength associated with the obfuscated asset (e.g., the time parameter). In some embodiments, the strength of obfuscation can be increased or decreased by increasing or decreasing the scope of information to be obfuscated. For instance, it may be determined whether to obfuscate code only, data only, keys only, or any combination thereof. For a given type of information such as a data table, it may be determined whether to obfuscate the entire data table, specific columns or rows of the table, or specific records of the table. For a given piece of code, it may be determined whether to obfuscate the variables, the control flow, or both.

At block 610, the customized obfuscation schemes may be applied to the asset to generate an obfuscated asset (e.g., obfuscated mobile application). In some embodiments, different obfuscation schemes may be applied to different or the same portions of the asset in the same or different orders. In some embodiments, the obfuscation schemes include directive as to the manner in which the schemes should be applied. In some other embodiments, the combination of obfuscation parameters used to determine the customized obfuscation schemes may also determine, at least in part, the way the schemes are applied to the asset. For instance, the account attributes and/or time parameter can be used to determine how many times a particular obfuscation scheme is applied to an asset, an order in which different obfuscation schemes are applied to the asset, different portions within the asset to which the obfuscation schemes are applied, and the like.

At block 612, the obfuscated asset can be deployed to the determined mobile devices within the deployment group. In some embodiments, the obfuscated asset may be transmitted over a network to the one or more mobile devices within the deployment group. The deployment may occur over a period of time or at substantially the same time. The deployment may be occur using pull and/or push technologies. For instance, the mobile devices may be configured to "pull" or request to download the asset from an asset provider. Alternatively, the asset provider may "push" the obfuscated assets to the mobile devices without being requested to do so. In some other embodiments, a combination of the push and push technologies may be used. In some embodiments, the entire obfuscated asset may be deployed all at once. Alternatively, portions of the assets may be deployed at different times.

C. Obfuscation Using Geography

Figure 7:
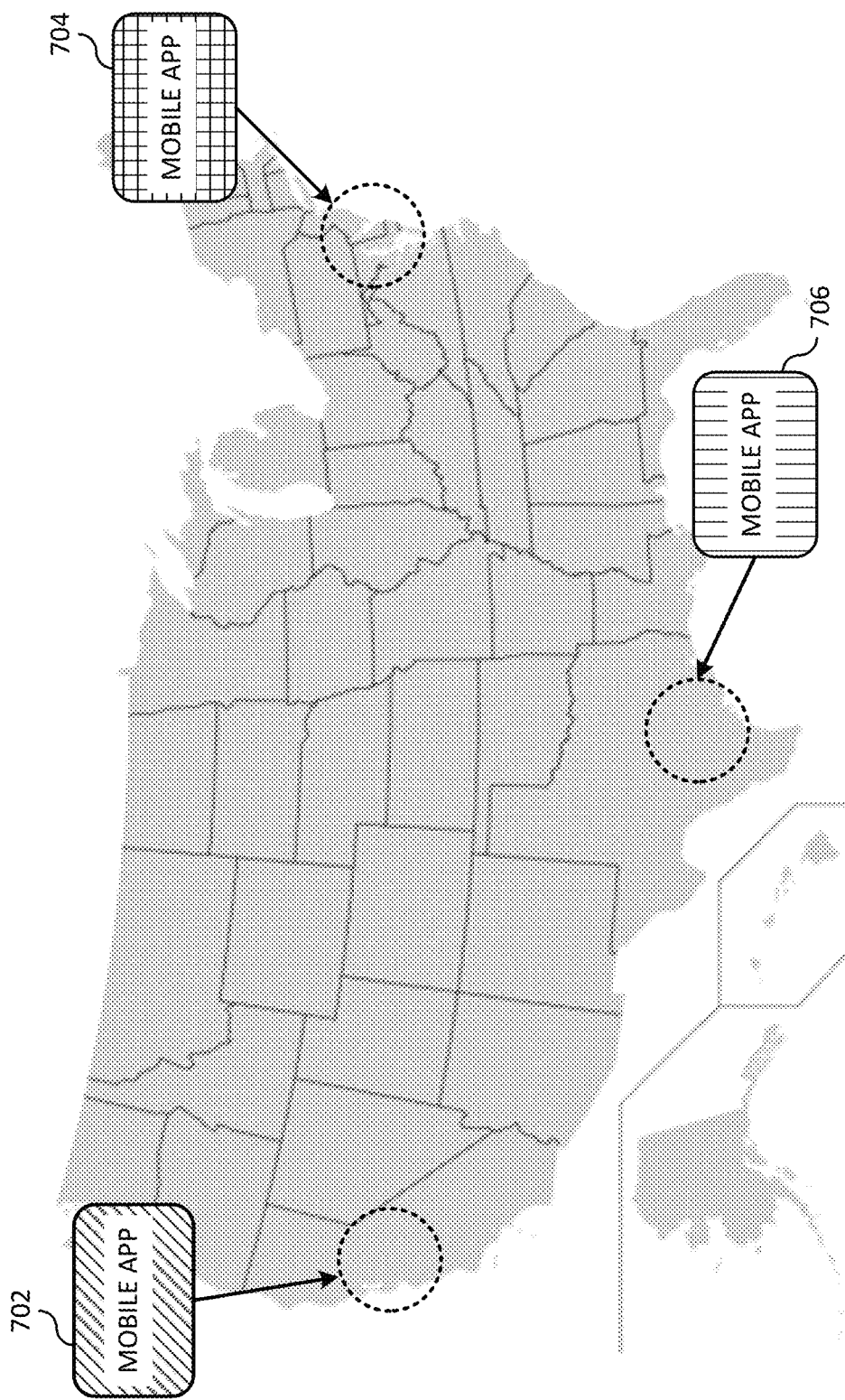
FIG. 7 illustrates an example of deploying mobile applications obfuscated by different techniques, in accordance to some embodiments.

In some embodiments, geographic regions may be used in addition to account attributes to determine an obfuscation scheme to be applied to an asset. FIG. 7 illustrates an example of deploying mobile applications obfuscated by different techniques, in accordance to some embodiments. In FIG. 7, mobile applications 702, 704, and 706 deployed in different geographic regions may all perform the same underlying functions. However, each mobile application may be obfuscated using a different technique than the other mobile applications. In some embodiments, the obfuscation can be performed at the source code level, at the compiled level, or both, and the mobile application deployed in different regions may be obfuscated at different levels. Various obfuscation techniques can be used. For example, mobile application 702 may utilize code encryption to encrypt the code using an encryption key; mobile application 704 may utilize variable renaming to rename variables in the code to unrecognizable names; and mobile application 706 may utilize flow transformation to reorder the flow of functions being called in the application. Other obfuscation techniques that may be used may include dummy code insertion where fake or unused code is inserted into the mobile application, register renaming in which values are assigned and reassigned to different register names, etc.

In some embodiments, the same type of obfuscation may be used, but different mobile applications may utilize different seed for obfuscation. For example, mobile application 702 may be encrypted using a key that is different than mobile application 704, or the variables being renamed in mobile application 704 may be different than the variables being renamed in mobile application 706, or the variables in the different mobile applications are renamed to different names. In some embodiments, each mobile application may use a combination of various obfuscation techniques, and different mobile applications may use a different combination of obfuscations.

By deploying differently obfuscated mobile applications in different regions, an attack that successfully de-obfuscates the mobile applications in one region may be ineffective in another region. This not only limits the impact area of the attack, but can also be used to isolate which obfuscation implementation has been breached. Such techniques may also improve detection of malware capable of large scale attack, because malware that is capable of de-obfuscating the mobile applications across a large number of regions would necessary include code to address each type of obfuscation, causing the size of the malware to increase making it more easily detectable (e.g., an infected mobile application may have a significantly larger size than an uninfected mobile application).

As discussed above, the deployment of different obfuscated mobile applications can be applied based on geographical region as shown, or can be based on other criteria. For example, different obfuscated mobile applications may be deployed for different PAN or token ranges, different issuers, different account holder names (e.g., last names that starts with A-F uses one obfuscation, whereas last names that starts with G-M uses a different obfuscation scheme, etc.), different credit limits, etc.

D. Various Obfuscation Techniques in Code

Figure 8:
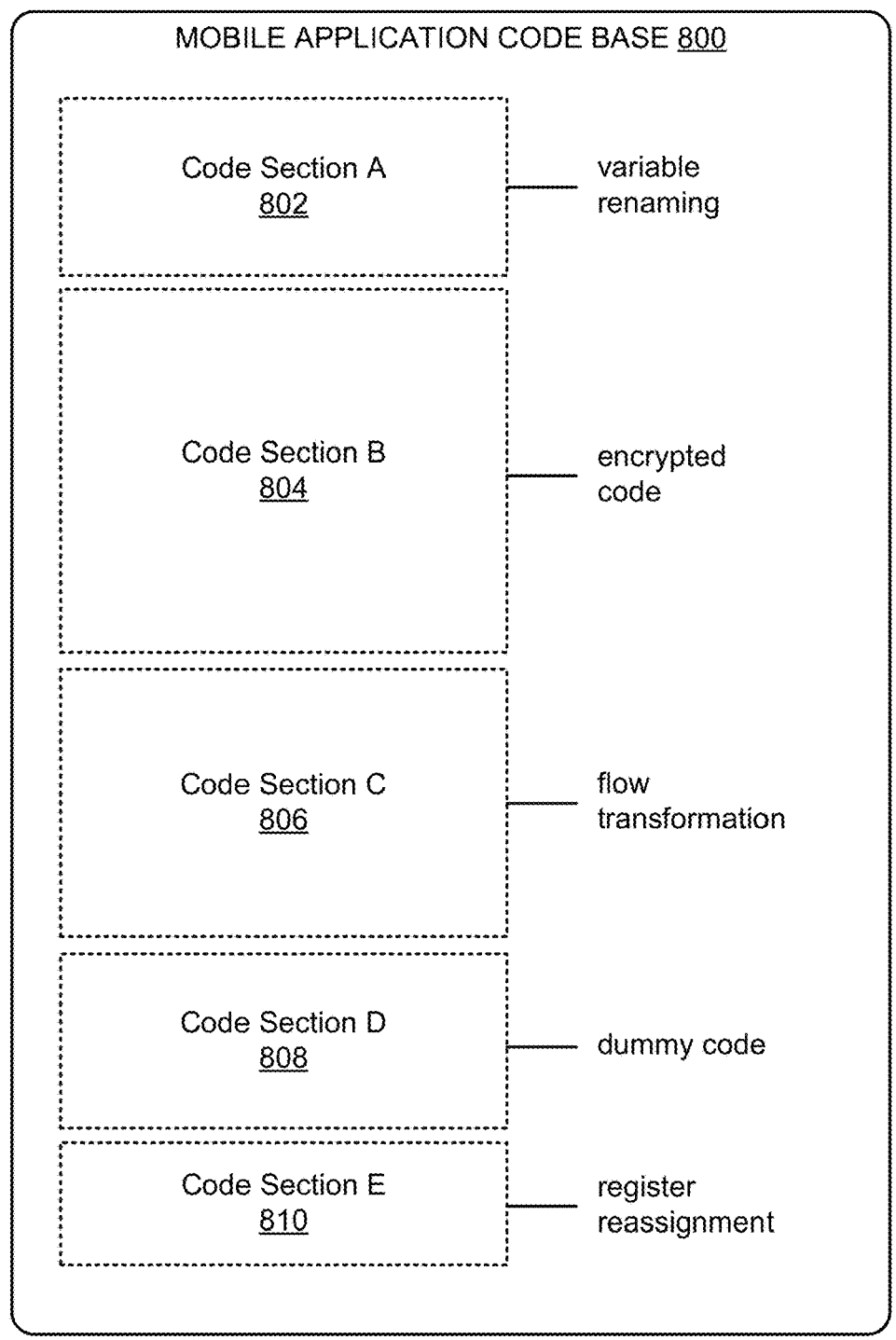
FIG. 8 illustrates an example in which the mobile application code base is obfuscated using different techniques in different code sections, in accordance with some embodiments.

In some embodiments, a mobile application may use different combinations of obfuscation techniques in different code sections within the same code. FIG. 8 illustrates an example in which the mobile application code base 800 is obfuscated using different techniques in different code sections, in accordance with some embodiments. Mobile application code base 800 may include code section A 802, code section B 804, code section C 806, code section D 808, and code section E 810. In some embodiments, the code sections may be segregated based on functionality, hierarchy, arbitrarily, or randomly. In the example shown, code section A 802 may be obfuscated by variable renaming; code section B 802 may be obfuscated by encryption, code section C 804 may be obfuscated using flow transformation; code section D may be dummy code that was inserted into code base 800; and code section E may be obfuscated using register reassignment. In some embodiments, each code section may use a combination of more than one obfuscation technique. Moreover, different mobile applications deployed in different regions or deployed under the other criteria described above may segregate the code sections differently, and may also apply different combinations or one or more code obfuscation techniques to different sections.

E. Deployment of Mobile Application

Figure 9:
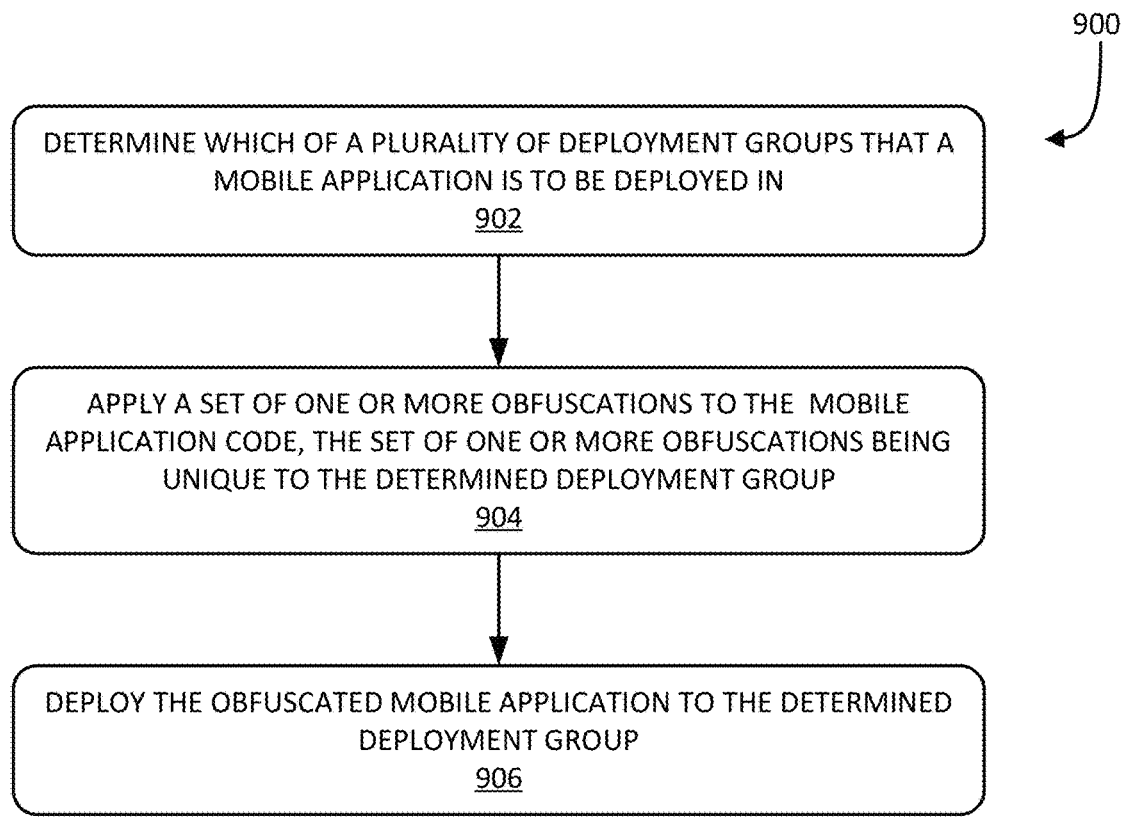
FIG. 9 illustrates an example process for deployment of mobile applications, according to some embodiments.

FIG. 9 illustrates an example process 900 for deployment of mobile applications, according to some embodiments.

At block 902, it can be determined which of a plurality of deployment groups that a mobile application is to be deployed in. The deployment group can be based on a PAN or token range, issuer, account holder name, credit limit, a risk score or score range, or other types of account holder of account related data. Additionally or alternatively, the deployment group may be determined based on a time parameter, device attributes, or other obfuscation parameters discussed herein.

At block 904, a set of one or more obfuscations may be applied to the mobile application code, where the set of one or more obfuscations is unique to the determined deployment group (i.e. different deployment groups use different obfuscations). In some embodiments, the mobile application code may be segregated into a plurality of code sections. The code sections may be segregated based on, for example, functionality, hierarchy, arbitrarily, or randomly. A different combination of one or more obfuscation technique can be applied to each of the code sections. In some embodiments, the segregation of the code and/or the combination of obfuscation techniques to be applied to the code sections may be determined based at least in part on the obfuscation parameters discussed herein.

At block 906, the obfuscated mobile application may be deployed to the determined deployment group (e.g., via an application store such as Google Play).

VII. Obfuscation Update Methods

According to embodiments, after an obfuscated asset has been deployed to mobile devices, a series of subsequent update obfuscation can be applied to the previously-deployed assets to provide additional security. Aspects of the obfuscation update (e.g., frequency, obfuscation techniques, scope of update, etc.) may be determined can be customized for deployment groups so as to prevent or mitigate the risk of scalable attacks.

Figure 10:
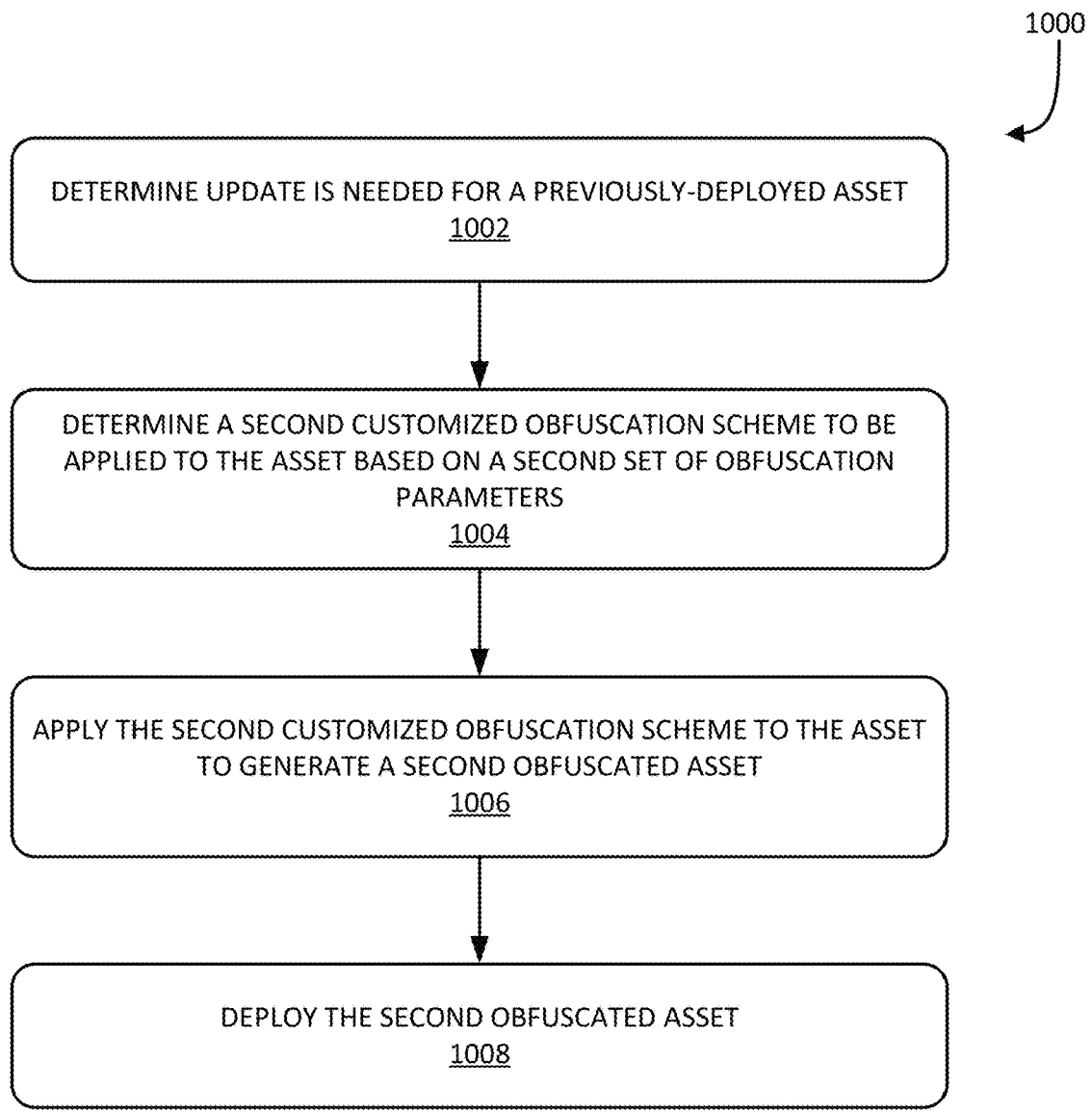
FIG. 10 illustrates an example process for updating obfuscation, in accordance with some embodiments.

FIG. 10 illustrates an example process 1000 for updating obfuscation, in accordance with some embodiments. Aspects of the process 1000 may be performed by an asset provider and/or a mobile device discussed herein.

At block 1002, process 1000 can include determining that update is needed for a previously-deployed asset. For instance, the asset may include a mobile application or a portion thereof. In some embodiments, the determination of when an update is needed can be based at least in part on a level of strength associated with the previously-obfuscated asset and/or a first set of customized obfuscation schemes that were used to obfuscate the asset before it was deployed. If the previous obfuscation is strong, the updated obfuscation may be provided at a later time than if the previous obfuscation is weak.

In some embodiments, the determination of when an update is needed can be based at least in part on at least one of a first set of obfuscation parameters that were used to determine the first set of customized obfuscation schemes. For instance, a time parameter within the first set of obfuscation parameter may indicate 2 weeks. The update frequency may be generated based on this time parameter. As another example, the update frequency may be determined based at least in part on other parameters of the first set of obfuscation parameters such as account attributes, device attributes, geographic location, and the like. For instance, it may be determined that a particular update frequency is to be used for assets deployed to accounts with certain account attributes such as PAN or token range, issuer, risk score or risk score range, credit limits, and the like. Additionally, the update frequency may be dependent on device attributes (e.g., operating system) and/or geographic locations of the mobile devices.

Additionally or alternatively, the frequency of such updates may be determined based at least in part on the objectives or requirements, security landscape, computing resources, and other considerations for an asset provider, a mobile device, a network environment, and the like. For example, a mobile device associated with a premium account may receive more frequent updates than a mobile device associated with a regular account. As another example, For example, an asset provider may determine that the length of time to update obfuscation of an obfuscated asset should be two times an estimated time-to-break associated with the obfuscated asset. For example, if the time-to-break associated with the obfuscated asset is 2 weeks, then the time to update obfuscation is 4 weeks since the deployment of the obfuscated asset or the last obfuscation update to the mobile device. In some embodiments, once an update is deployed, a new time-to-break may be determined (e.g., estimated) for the updated obfuscated asset and a new update time period may be determined based on the new time-to-break.

As another example, the update frequency may be determined based at least in part on a security landscape with respect to the mobile devices and/or obfuscated assets. For example, if there is a known security breach to a mobile device on which an obfuscated asset is deployed, that mobile device may be updated sooner than another device that has not been breached. As another example, if a particular obfuscation technique is known to have been de-obfuscated (e.g., reverse engineered), devices receiving assets that have been obfuscated using the particular obfuscation technique may be updated to use alternative obfuscation techniques.

As another example, the update frequency may be determined based at least in part on a computing resources available at the asset provider and/or mobile devices. For example, an asset provider may be configured to provide more frequent updates when more computing resources are available to the asset provider; and vice versa. Similarly, a mobile device may be configured to receive more frequent updates when more computing resources are available to the mobile device; and vice versa.

At block 1004, a second set of one or more customized obfuscation schemes used to update obfuscation for the asset can be determined based at least in part on a second set of one or more obfuscation parameters. The second set of obfuscation parameters may be related to the first deployment group that the asset was previously deployed to. Alternatively, the second set of obfuscation parameters may be related to a second deployment group that is a subset of the first deployment group, for example, based on common attributes shared by mobile devices within the subset (e.g., account attributes, device attributes, geographic locations, security landscape, and the like).

The second set of obfuscation parameters may or may not overlap with the first set of obfuscation parameters that was previously used to determine the first set of customized obfuscation schemes. For example, in some cases, the second set of obfuscation parameters reflect more updated values for some or all of the parameters in the first set of obfuscation parameters. In some cases, the second set of obfuscation parameters includes additional parameters not included in the first set of obfuscation parameters. In some other cases, the second set of obfuscation parameters omits some of the parameters in the first set of obfuscation parameters.

In some embodiments, the second set of customized obfuscation schemes can be determined using the techniques similar to those described in FIGS. 5-9. For instance, the second set of customized obfuscation schemes can be selected from a plurality of obfuscation schemes based on the second set of obfuscation parameters. Alternatively or additionally, the second set of customized obfuscation schemes can be provided as an input to one or more obfuscation algorithms to generate the second set of customized obfuscation schemes. In some embodiments, the second set of customized obfuscation schemes can be generated based on the first set of customized obfuscation schemes. For instance, if one of the first set of customized obfuscation schemes is known to have security issues, the second set of customized obfuscation schemes may include an updated obfuscation scheme to address such security issues. In some embodiments, at least one of the second set of customized obfuscation schemes may have the same algorithm as at least one of the first set of customized obfuscation schemes except that a different key is used. In some other embodiments, at least one of the second set of customized obfuscation schemes may have the different algorithm any of the first set of customized obfuscation schemes.

At block 1006, the second set of obfuscation schemes can be applied to the previously-obfuscated asset to generate a second obfuscated asset. In some embodiments, a manner in which the obfuscation schemes should be applied can be determined. For instance, it may be determined to which portions of the asset the second set of obfuscation schemes should apply. For instance, some obfuscation schemes of the second set of obfuscation schemes may be applied to a first portion of the asset whereas some other obfuscation schemes of the second set of obfuscation schemes may be applied to a second portion of the asset. As another example, it may be determined in what order the schemes are applied or a number of times a particular scheme is to be applied. Some of the obfuscation schemes may be applied repeatedly; while others may be applied only once. In some cases, For instance, it may be determined whether second set of obfuscation schemes should be applied in an incremental manner or not relative to the previously applied first set of customized obfuscation schemes. For instance, in an incremental update, the second set of customized obfuscation schemes are applied directly on top of the previously obfuscated asset. In a non-incremental update, the second set of customized obfuscation schemes are applied on an un-obfuscated asset (i.e., without the first obfuscation). In some cases, incremental update may be applied to one portion of the asset while non-incremental update may be applied to another portion of the asset. In various embodiments, the manner in which the second set of obfuscation schemes should be applied can be determined on a variety of factors such as the type of assets or portions thereof (e.g., code, data, or keys), type of obfuscation schemes applied (e.g., encryption, code obfuscation, or white-box cryptography), obfuscation parameters (e.g., account attributes, time parameter, device attributes, geographic locations), security landscape, business requirements, user preferences, and the like.

At block 1008, the second obfuscated asset can be deployed. In some embodiments, the second obfuscated asset can be deployed to the first deployment group that the previously-obfuscated asset was deployed to. In some other embodiments, the second obfuscated asset can be deployed to a second deployment group that may be a subset of the first deployment group.

In some embodiments, the update obfuscation can occur at an asset provider. The updated asset is then redeployed to mobile devices and/or an intermediate device between an asset provider and a mobile device. In some other embodiments, the update obfuscation can occur at individual mobile devices. In such embodiments, a mobile device may be configured to update obfuscation for an asset on the mobile device or a portion thereof based at least in part on update instructions received from an asset provider. The instructions may be "pulled" by the mobile device and/or "pushed" to the mobile device from an asset server. For instance, the instructions may include or indicate at least some of the following: at least some of the second set of obfuscation parameters to be used for determining the second set of customized obfuscation schemes, at least some of the second set of customized obfuscation schemes to be applied to the asset, the manner in which the second set of customized obfuscation schemes should be applied (e.g., incremental or not, order of application, portions of the asset to applied, etc.), and the like. In some embodiments, the instructions may include actual obfuscation information (e.g., code and keys for implementing an encryption algorithm, obfuscation parameters). In some other embodiments, the instructions may include mere indications (e.g., identifiers, bitmap, URL, etc.) of how and/or where to retrieve such information.

In some other embodiments, a mobile device may be configured to update obfuscation for an asset automatically without relying on instructions from an asset provider. For example, the mobile device may be configured to update obfuscation on a periodic basis or based on predefined triggering events.

VIII. Computer Apparatus

Figure 11:
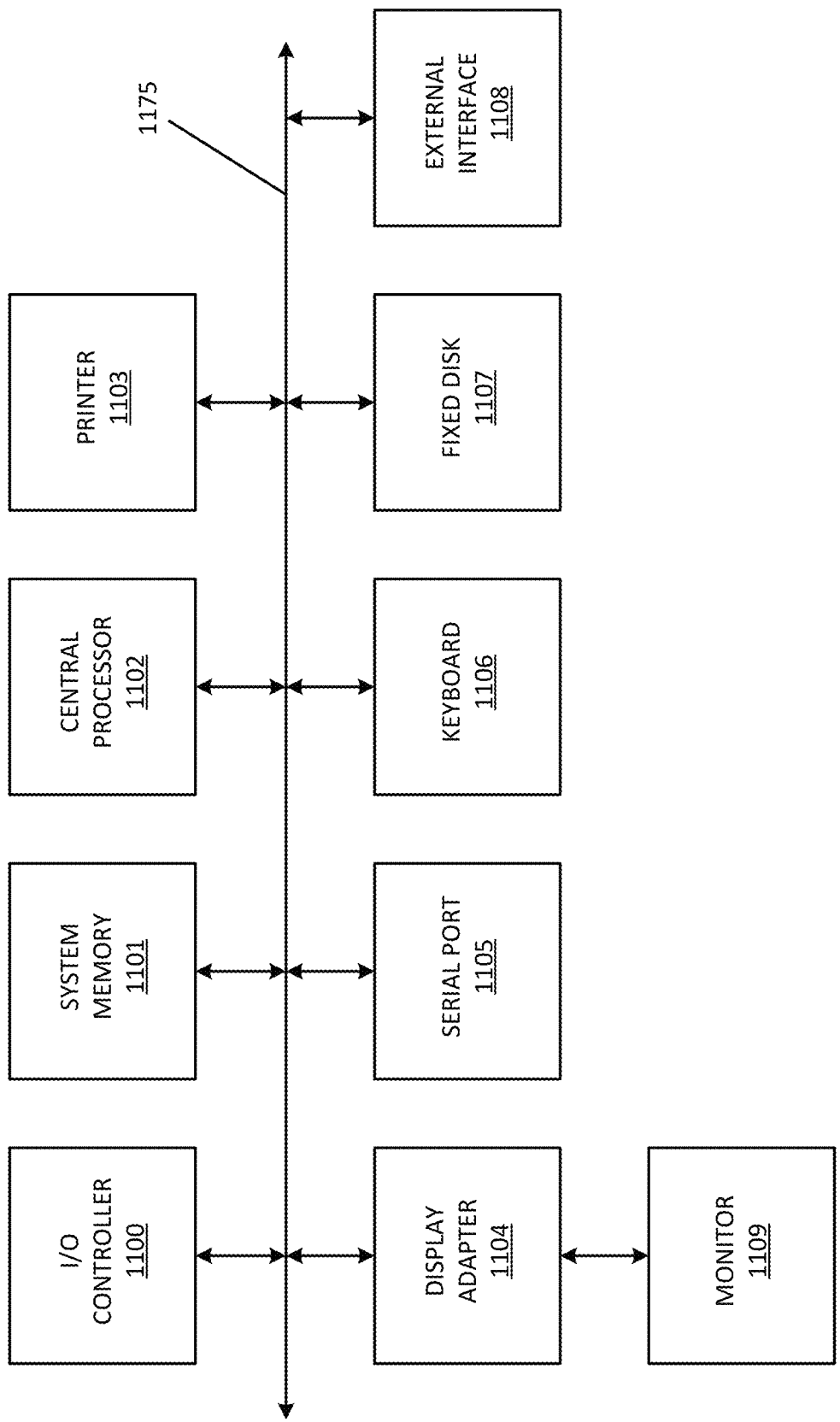
FIG. 11 illustrates is a high level block diagram of a computer system, in accordance with some embodiments.

FIG. 11 illustrates is a high level block diagram of a computer system that may be used to implement any of the entities or components (e.g., toll payment server) described above, according to some embodiments. The subsystems shown in FIG. 11 are interconnected via a system bus 975. Additional subsystems include a printer 1103, keyboard 1106, fixed disk 1107, and monitor 1109, which is coupled to display adapter 1104. Peripherals and input/output (I/O) devices, which couple to I/O controller 1100, can be connected to the computer system by any number of means known in the art, such as a serial port. For example, serial port 1105 or external interface 1108 can be used to connect the computer apparatus to a wide area network such as the Internet, a mouse input device, or a scanner. The interconnection via system bus 975 allows the central processor 1102 to communicate with each subsystem and to control the execution of instructions from system memory 1101 or the fixed disk 1107, as well as the exchange of information between subsystems. The system memory 1101 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The asset obfuscation techniques described herein can provide tailored or customized obfuscation of digital assets (e.g., mobile applications) deployed to various mobile devices. By increasing the variance or difference among the deployed assets, the risk of massive or scalable security attacks can be mitigated. In particular, attackers are now required to build into their malware different solutions for each new upgrade or variation in security implementation, therefore increasing the size of the necessary malware, making it easier to identify and prevent. Such malware would also take more time and effort to develop, limiting the window for deployment. In addition, the size of the user communities affected by a successful attack can be decreased.

The above description is illustrative and is not restrictive. Many variations of the invention may become apparent to those skilled in the art upon review of the disclosure. The scope of the invention may, therefore, be determined not necessarily with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method performed by a computer system, the method comprising:
   receiving, by the computer system, a mobile application that is to be installed on a plurality of mobile devices;
   identifying, by the computer system, the plurality of mobile devices on which the mobile application is installed, each of the plurality of mobile devices associated with a corresponding account stored on the computer system, each account having one or more account attributes;
   dynamically determining, by the computer system, a first set of obfuscation parameters;
   identifying, by the computer system, a first deployment group of mobile devices from the plurality of mobile devices for deploying the mobile application based on the first set of obfuscation parameters, the mobile devices in the first deployment group being a portion of the plurality of mobile devices, each of the plurality of mobile devices associated with a different account, and each account associated with a different account holder, wherein the one or more account attributes are common to the mobile devices within the first deployment group that is the portion of the plurality of mobile devices;
   determining, by the computer system, a first obfuscation scheme to be applied to the mobile application based at least in part on the first set of obfuscation parameters, wherein the first obfuscation scheme comprises a process for transforming the mobile application;
   generating a first obfuscated mobile application by obfuscating, by the computer system, the mobile application by applying the first obfuscation scheme to the mobile application;
   transmitting, by the computer system, over a network the first obfuscated mobile application to the mobile devices within the first deployment group;
   dynamically determining, by the computer system, a third set of obfuscation parameters;
   identifying, by the computer system, a third deployment group of mobile devices from among the plurality of mobile devices that is in a same geographic region as the first deployment group for deploying the mobile application based on the third set of obfuscation parameters;
   determining, by the computer system, a third obfuscation scheme to be applied to the mobile application based at least in part on providing the third set of obfuscation parameters as an input to an obfuscation algorithm;
   generating a third obfuscated mobile application by obfuscating, by the computer system, the mobile application by applying the third obfuscation scheme to the mobile application; and
   transmitting, by the computer system, over the network the third obfuscated mobile application to the mobile devices within the third deployment group.

2. The method of claim 1, wherein determining the first obfuscation scheme comprises selecting the first obfuscation scheme from a plurality of obfuscation schemes based at least in part on the first set of obfuscation parameters.

3. The method of claim 1, wherein determining the first obfuscation scheme comprises providing the first set of obfuscation parameters as an input to the obfuscation algorithm.

4. The method of claim 1, wherein determining the first obfuscation scheme comprises:
   obtaining, an indicator of obfuscation strength to be applied in the first obfuscation scheme for the mobile application; and
   determining one or more categories of information to obfuscate based on the indicator of obfuscation strength associated with the first obfuscated mobile application, the one or more categories of information comprising code, data, or cryptographic key.

5. The method of claim 4, wherein determining the first obfuscation scheme comprises:
   determining a level of obfuscation to be used for obfuscating information of at least one category of the one or more categories of information based on the indicator of obfuscation strength.

6. The method of claim 1, further comprising
   determining that obfuscation of the mobile application is to be updated;
   determining a second obfuscation scheme to be applied to the mobile application based at least in part on a second set of one or more obfuscation parameters;
   applying the second obfuscation scheme to the mobile application to generate a second obfuscated mobile application; and
   deploying the second obfuscated mobile application to at least one of the mobile devices within the first deployment group.

7. The method of claim 6, further comprising:
   determining, by the computer system, an update frequency for updating the mobile application based at least in part on a level of strength of the first obfuscation scheme or the first set of obfuscation parameters.

8. The method of claim 1, further comprising
   determining, by the computer system, that obfuscation of the mobile application is to be updated; and transmitting, by the computer system, to at least one mobile device, of the mobile devices within the first deployment group, one or more instructions for applying an updated obfuscation scheme to the mobile application using a second set of one or more obfuscation parameters.

9. The method of claim 8, wherein the one or more instructions include the second set of one or more obfuscation parameters.

10. The method according to claim 1, further comprising identifying, by the computer system, a second deployment group of mobile devices of the plurality of mobile devices for deploying the mobile application based on a second set of one or more obfuscation parameters, the mobile devices of the second deployment group being a second portion of the plurality of mobile devices,
wherein the second set of one or more obfuscation parameters comprise one or more second account attributes, wherein the one or more second account attributes are common to the mobile devices within the second deployment group that is the portion of the plurality of mobile devices.

11. The method according to claim 1, wherein the plurality of mobile devices on which the mobile application is installed are identified based on a geographic region, an operating system, or a carrier.

12. A non-transitory computer-readable storage media storing computer-executable instructions that, when executed by a processor, causes the processor to perform steps comprising:
receiving a mobile application for a plurality of mobile devices;
identifying the plurality of mobile devices on which the mobile application is installed, each of the plurality of mobile devices associated with a corresponding account, each account having one or more account attributes;
dynamically determining a first set of obfuscation parameters;
identifying a first deployment group of mobile devices from the plurality of mobile devices for transmitting the mobile application based on the first set of obfuscation parameters, the mobile devices in the first deployment group being a portion of the plurality of mobile devices, each of the plurality of mobile devices associated with a different account, and each account associated with a different account holder, wherein the one or more account attributes are common to the mobile devices within the first deployment group that is the portion of the plurality of mobile devices;
determining a first obfuscation scheme to be applied to the mobile application based at least in part on the first set of obfuscation parameters;
generating a first obfuscated mobile application by obfuscating the mobile application by applying the first obfuscation scheme to the mobile application;
transmitting over a network the first obfuscated mobile application to the mobile devices within the first deployment group;
dynamically determining a third set of obfuscation parameters;
identifying a third deployment group of mobile devices from among the plurality of mobile devices that is in a same geographic region as the first deployment group for deploying the mobile application based on the third set of obfuscation parameters;
determining a third obfuscation scheme to be applied to the mobile application based at least in part on providing the third set of obfuscation parameters as an input to an obfuscation algorithm;
generating a third obfuscated mobile application by obfuscating the mobile application by applying the third obfuscation scheme to the mobile application; and
transmitting over the network the third obfuscated mobile application to the mobile devices within the third deployment group.

13. The non-transitory computer-readable storage media of claim 12, wherein determining the first obfuscation scheme comprises selecting the first obfuscation scheme from a plurality of obfuscation schemes based at least in part on the first set of obfuscation parameters.

14. The non-transitory computer-readable storage media of claim 12, wherein the mobile application comprises code, data, or a cryptographic key.

15. The non-transitory computer-readable storage media of claim 12, wherein the first obfuscation scheme is applied to a first portion of the mobile application and wherein the computer-executable instructions, when executed by the processor, causes the processor to perform operations further comprising:
determining a second obfuscation scheme to be applied to the mobile application based at least in part on the first set of obfuscation parameters; and
applying the second obfuscation scheme to a second portion of the mobile application.

16. The non-transitory computer-readable storage media of claim 12, wherein the computer-executable instructions, when executed by the processor, further causes the processor to perform operations comprising:
determining a time when the mobile application needs to be updated based at least in part on a level of strength of the first obfuscation scheme;
determining a second obfuscation scheme to be applied to at least one portion of the mobile application based at least in part on a second set of one or more obfuscation parameters; and
applying the second obfuscation scheme to the at least one portion of the mobile application to generate a second obfuscated mobile application.

17. The non-transitory computer-readable storage media of claim 16, wherein determining the time when the mobile application needs to be updated is based at least in part on an indicator of obfuscation strength of the first obfuscation scheme.

18. A computer system, comprising:
a memory storing instructions; and
a processor coupled to the memory, the processor configured to:
receive a mobile application that is to be deployed to a plurality of mobile devices;
identify the plurality of mobile devices on which the mobile application is installed, each of the plurality of mobile devices associated with a corresponding account stored on the computer system, each account having one or more account attributes;
dynamically determine a first set of obfuscation parameters;
identify a first deployment group from mobile devices of the plurality of mobile devices for deploying the mobile application based on the first set of obfuscation parameters, the mobile devices in the first deployment group being a portion of the plurality of mobile devices, each of the plurality of mobile devices associated with a different account, and each account associated with a different account holder, wherein the one or more account attributes are common to the mobile devices within the first deployment group that is the portion of the plurality of mobile devices;

determine an obfuscation scheme to be applied to the mobile application based at least in part on the first set of obfuscation parameters;

generate a first obfuscated mobile application by obfuscating the mobile application by applying the obfuscation scheme to the mobile application;

transmit over a network the first obfuscated mobile application to the mobile devices within the first deployment group;

dynamically determine a third set of obfuscation parameters;

identify a third deployment group of mobile devices from among the plurality of mobile devices that is in a same geographic region as the first deployment group for deploying the mobile application based on the third set of obfuscation parameters;

determine a third obfuscation scheme to be applied to the mobile application based at least in part on providing the third set of obfuscation parameters as an input to an obfuscation algorithm;

generate a third obfuscated mobile application by obfuscating the mobile application by applying the third obfuscation scheme to the mobile application; and transmit over the network the third obfuscated mobile application to the mobile devices within the third deployment group.

19. The computer system of claim 18, wherein the processor is further configured to:

identify a second deployment group of mobile devices for deploying the mobile application based on a second set of one or more obfuscation parameters, the mobile devices of the second deployment group being the portion of the plurality of mobile devices, wherein the mobile devices within the second deployment group share the second set of one or more obfuscation parameters comprising the one or more account attributes;

determine a second obfuscation scheme to be applied to the mobile application based at least in part on the second set of one or more obfuscation parameters;

apply the second obfuscation scheme to the mobile application to generate a second obfuscated mobile application; and transmit over the network the second obfuscated mobile application to the mobile devices within the second deployment group.

* * * * *